(12) United States Patent
Onodera et al.

(10) Patent No.: US 6,195,669 B1
(45) Date of Patent: Feb. 27, 2001

(54) PHYSICAL RANDOM NUMBER GENERATOR, METHOD OF GENERATING PHYSICAL RANDOM NUMBERS AND PHYSICAL RANDOM NUMBER STORING MEDIUM

(75) Inventors: Toru Onodera; Shigeru Kanemoto; Shigeaki Tsunoyama, all of Kanagawa-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/150,928

(22) Filed: Sep. 10, 1998

(30) Foreign Application Priority Data

Sep. 12, 1997 (JP) .................................. 9-249109

(51) Int. Cl.$^7$ ................................ G06J 1/00; G06F 1/02
(52) U.S. Cl. ................................ 708/3; 708/250
(58) Field of Search ................................ 708/3, 250–251

(56) References Cited

U.S. PATENT DOCUMENTS

| 3,582,882 | 6/1971 | Titcomb et al. . |
| 4,355,366 | 10/1982 | Porter . |
| 4,853,884 | 8/1989 | Brown et al. . |
| 5,506,796 | * 4/1996 | Ishida .................... 708/250 |
| 5,966,313 | * 10/1999 | Sakamoto ................ 708/250 |

FOREIGN PATENT DOCUMENTS

| 42 13 988 | 11/1993 | (DE) . |
| 195 00 599 | 7/1996 | (DE) . |
| 0 619 659 | 10/1994 | (EP) . |
| 7-111420 | 4/1995 | (JP) . |

OTHER PUBLICATIONS

Patent Abstracts of Japan, vol. 6, No. 116 (P–125), 1982, JP 57 045645, Mar. 15, 1982.

* cited by examiner

*Primary Examiner*—Tan V. Mai
(74) *Attorney, Agent, or Firm*—Oblon, Spivak, McClelland, Maier & Neustadt, P.C.

(57) ABSTRACT

A physical random number generator including a noise source configured to generate a noise signal, an alternating current AC coupling amplifying device which amplifies the noise signal while removing a direct current DC component therefrom by AC coupling to generate an amplified noise signal, an analog/digital A/D conversion device having an accuracy of not less than two bits which A/D converts the amplified noise signal to digital values composed of bit data of not less than two bits, and a processing device which processes the amplified noise signal and which processes digital values converted from a processed amplified noise signal to generate random number data of not less than two bits with an increased differential nonlinearity as compared to digital values unprocessed by the processing device.

27 Claims, 14 Drawing Sheets a) SHIFT FROM UNIFORMITY AGAINST OFFSET b) SHIFT FROM UNIFORMITY AGAINST GAIN

PHYSICAL RANDOM NUMBER GENERATOR, METHOD OF GENERATING PHYSICAL RANDOM NUMBERS AND PHYSICAL RANDOM NUMBER STORING MEDIUM

BACKGROUND OF THE INVENTION

1. Field of the Invention

This invention relates to a physical random number generator, a method of generating physical random numbers and a physical random number storing medium. More, particularly, this invention relates to a physical random number generator, a method of generating physical random numbers and a physical random number storing medium that are applicable to a wide field ranging from general purpose computers to such a civil life level as personal computers, game machines, etc.

2. Description of the Related Art

Physical random numbers are those random numbers prepared utilizing random phenomena of the physical world, and as representative random phenomena, generation of radiation, fluctuation of thermal noises and the like are pointed out.

A conventional physical random number generator measures interval of generation or frequency of generation of random pulses generated from noise sources using radiation and thermal noise as noise sources.

For instance, when the numbers of radiation generated per unit time are measured repeatedly and a frequency distribution of measured values is prepared, it becomes close to the normal distribution of an average N and a standard deviation $N^{1/2}$. That is, when the measurements are made 100 times, the measured values in 99 times will fall in the range from $N-3N^{1/2}$ to $N+3N^{1/2}$. Since the frequency distribution of measured values is the normal distribution, they are usable directly as normal distribution random numbers; however, a uniform distribution is generally convenient in many cases and it is necessary to convert the normal distribution into uniform random numbers.

So, in order to obtain uniform random numbers from the normal distribution, a conventional physical random number generator uses only lowest digit values of the measured results to generate random numbers that are not depending on the frequency distribution shape. Further, by using one bit value as the lowest digits of obtained measured values, the measured result can be divided into two categories: an even number or an odd number, and if the number N of generations is sufficiently large, respective generating frequency thereof becomes 50% and the character as random numbers is improved.

On a conventional physical random number generator, multi-bit random numbers are generated by providing a plurality of such one bit random number data generating circuits. Such prior art is set forth in, for instance, "Monte Carlo Method and Random Numbers" written by Mr. Shoji Ishida (Scientific Basic Theory Study, 17. 2. 29 (1965)) and the like.

However, such a conventional uniform physical random number generating method as described above has a problem that in order to obtain random number data from counted noise signals, N (100–200) noise signals must be counted, and therefore, much time is required to generate one random number.

Further, as random number data that can be generated from one noise source as a result of the above-described counting is of one bit, in order to generate random number data of byte unit which is the minimum unit that is handled by a computer, 8 non-correlative noise sources and 8 systems of random number generating circuits become necessary. This is a problem that must be solved for achieving a physical random number generator which is small in size and cheap in price.

Because of such problems, when a large scaled simulation is to be performed using random number data generated from a physical random number generator, even when a very high-speed CPU is mounted in a computer, as a time to obtain the result of computation depends on random number generating speed, it is not possible to achieve the high speed simulation.

Further, as 8 system noise sources and processing circuits are required to generate one-byte random numbers, the conventional physical random number generator is large scaled, and this is the factor that impedes the achievement of a low priced physical random number generator and the spread use thereof.

On the other hand, it is considered that if a high-speed and cheap priced physical random number generator is realized, it will be widely used not only in the field of scientific technical computation of, such as simulation, research relative to intelligence and study of security on a network, and in the field of communication equipments such as security of communication data, encoding of the modulation, and the like, but also in the field of such game machines as a probability for getting balls in pin-ball game machines, general game machines and the like.

SUMMARY OF THE INVENTION

Accordingly, one object of this invention is to provide a physical random number generator and a method of generating physical random numbers which can improve a physical random number generating speed and can provide physical random numbers of good quality as random numbers.

Another object of this invention is to provide a physical random number generator and a method of generating physical random numbers which are applicable to a wide field ranging from general purpose computers to such a civil life level as personal computers, game machines, etc.

Still another object of this invention is to provide a physical random number storing medium which can provide physical random numbers of good quality as random numbers.

Another object of this invention is to provide a physical random number storing medium which is applicable to a wide field ranging from general purpose computers to such a civil life level as personal computers, game machines, etc.

These and other objects of this invention can be achieved by providing a physical random number generator, including a noise source for generating a noise signal, an AC coupling amplifying unit for amplifying the noise signal while removing DC component therefrom by AC coupling to generate an amplified noise signal, and an A/D conversion unit for A/D converting the amplified noise signal to digital values and for generating random number data based on the digital values as an output of the physical random number generator.

According to one aspect of this invention, there is provided a physical random number display device, including the physical random number generator as described above, and a display unit for displaying data based on the random number data generated from the physical random number generator.

According to another aspect of this invention, there is provided a communication equipment, including the physical random number generator as described above, and a signal modulation unit for modulating a signal using the random number data generated from the physical random number generator.

According to still another aspect of this invention, there is provided a data encoder, including the physical random number generator as described above, and an encoding unit for encoding data using the random number data generated from the physical random number generator.

According to a further aspect of this invention, there is provided a physical random number input device, including the physical random number generator as described above, and a bus interface unit connected to interface with a data input/output bus of a computer for inputting the random number data generated from the physical random number generator into the computer.

According to another aspect of this invention, there is provided a physical random number input device, including the physical random number generator as described above, and a network interface unit connected to interface with a computer network for transmitting the random number data generated from the physical random number generator to the computer network in response to a request from a computer.

According to still another aspect of this invention, there is provided a physical random number storing medium readable by a computer in which the random number data generated by the physical random number generator as described above are stored.

According to a further aspect of this invention, there is provided a method of generating physical random numbers, including the steps of generating step for generating a noise signal from a noise source, AC coupling amplifying step for amplifying the noise signal while removing DC component therefrom by AC coupling to generate an amplified noise signal, A/D conversion step for A/D converting the amplified noise signal to digital values, and generating step for generating random number data based on the digital values as an output of the physical random number generator.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
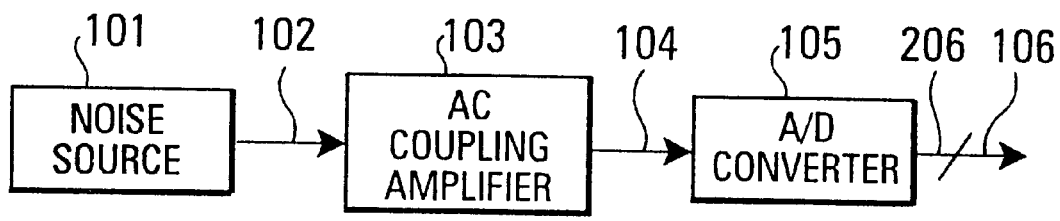
FIG. 1 is a block diagram showing the structure of a physical random number generator according to a first embodiment of the present invention.

Referring now to the drawings, wherein like reference numerals designate identical or corresponding parts throughout the several views, the embodiments of this invention will be described below.

Hereinafter, a first embodiment of this invention will be described.

FIG. 1 is a block diagram showing the structure of a physical random number generator according to a first embodiment of the present invention.

In this physical random number generator, a noise signal 102 from a noise source 101 is input to an AC coupling amplifier 103 and its amplified noise signal 104 is A/D converted in an analog-to-digital converter (hereinafter referred to as A/D converter) 105 into digital values 206, which are output as a random number data 106. Here, A/D converter 105 is an A/D converter having accuracy of 1 bit or not less than 2 bits.

Figure 2:
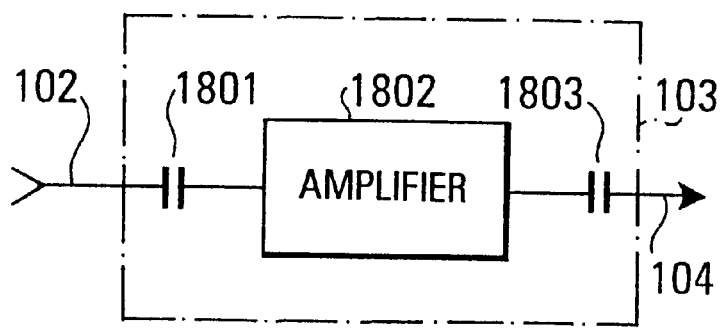
FIG. 2 is a diagram showing the internal structure of the AC coupling amplifier in the physical random number generator in the first embodiment.

FIG. 2 is a diagram showing the inner structure of AC coupling amplifier 103 of the physical random number generator shown in FIG. 1.

AC coupling amplifier 103 is a portion to amplify noise signal 102 while keeping its DC component not to pass by AC coupling. It is composed of an input capacitor 1801 to which noise signal 102 is input, an amplifier 1802 to amplify the output signal of input capacitor 1801 and to input the amplified output signal to an output capacitor 1803 and output capacitor 1803 to output amplified noise signal 104.

Then, the operation of the physical random number generator in the above structure according to this embodiment of the present invention will be described.

First, a noise component caused by a random phenomenon is output from noise source 101. An example of this noise signal waveform is shown in FIG. 3.

Figure 3:
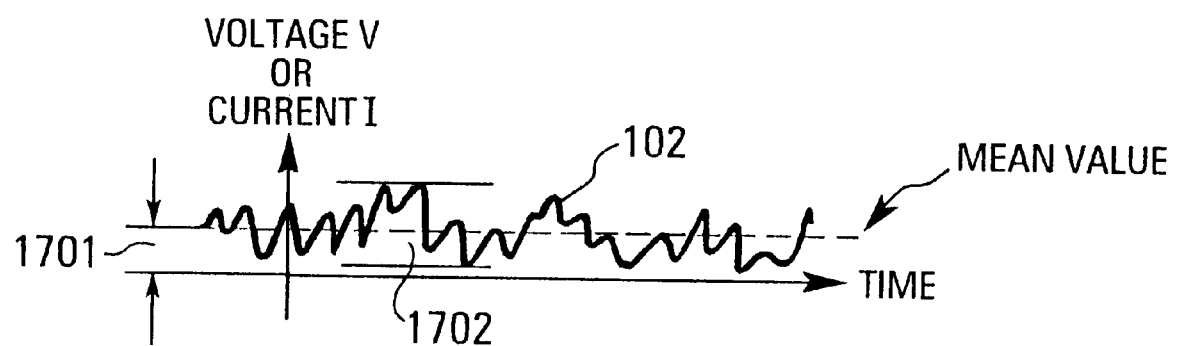
FIG. 3 is a diagram showing an example of noise signal waveform.

FIG. 3 is a diagram showing an example of the noise signal waveform.

Although varying depending on noise source 101 that is used, the noise signal waveform becomes a waveform that is composed by adding an offset voltage (or current) 1701 and a noise component 1702 that is distributed around it.

The level of noise component obtained from noise source 101 is generally small, and it is therefore necessary to amplify noise signal 102 using an amplifier having a large amplification factor. However, if noise signal 102 is amplified together with offset 1701, the output signal of the amplifier is saturated, and as a result, the amplifier does not properly operate. So, AC coupling amplifier 103 is used as an amplifier circuit, and only noise component 1702 excluding offset 1701 is amplified.

That is, the amplifying operation shown below is executed in AC coupling amplifier 103.

First, offset 1701 in noise signal 102 is removed by input capacitor 1801, and noise component 1702 only is amplified by amplifier 1802. Further, DC voltage obtained by amplifying the offset of amplifier 1802 itself is removed by output capacitor 1803 so that it is not included in amplified noise signal 104.

Accordingly, amplified noise signal 104 will become a waveform wherein the offset is made zero by the AC coupling and the noise components are distributed uniformly around the zero.

For instance, when amplified noise signal 104 is converted into digital values 206 using A/D converter 105 of 1-bit accuracy, it becomes a value of 0 or 1 according to the polarity of amplified noise signal 104.

This operation of A/D converter 105 will be described in more detail using examples shown in FIG. 3A and FIG. 3B.

Figure 3A:
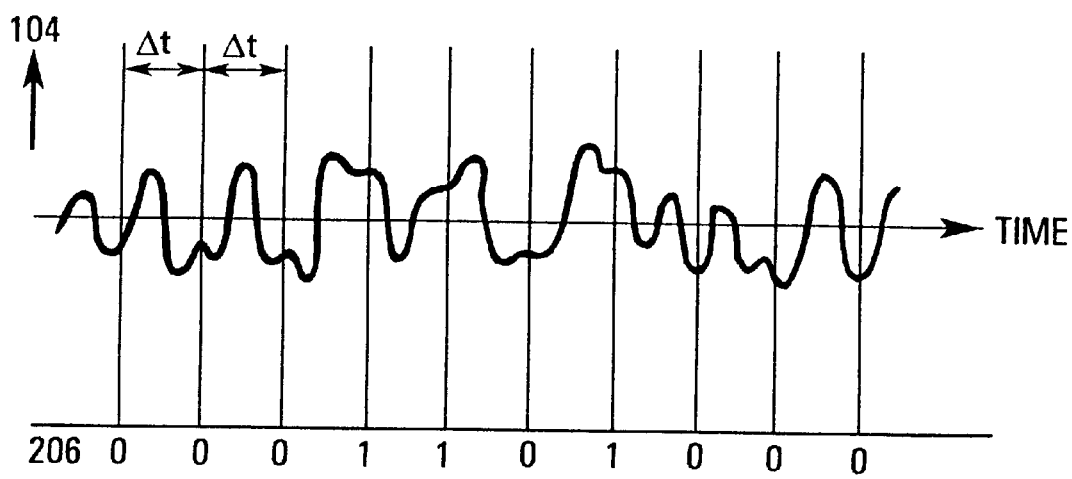
FIG. 3A is a diagram showing another example of the operation of A/D converter 105 shown in FIG. 1.

Firstly, it is assumed that A/D converter 105 is of 1-bit accuracy and the waveform of amplified noise signal 104 is shown in FIG. 3A. A/D converter 105 converts amplified noise signal 104 into digital values 206 at predetermined time intervals $\Delta t$. Digital values 206 obtained at the output of A/D converter 105 become values 0 and 1 as shown in FIG. 3A.

Figure 3B:
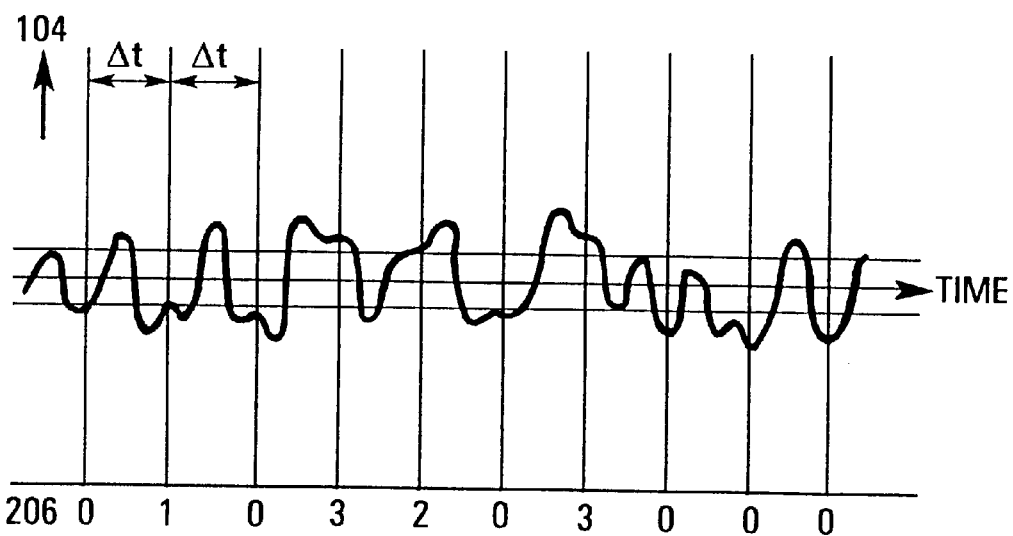
FIG. 3B is a diagram showing another example of the operation of A/D converter 105 shown in FIG. 1.

Next, it is assumed that A/D converter 105 is of 2-bit accuracy and the waveform of amplified noise signal 104 is shown in FIG. 3B. A/D converter 105 converts amplified noise signal 104 into digital values 206 at predetermined time intervals $\Delta t$. Digital values 206 obtained at the output of A/D converter 105 become values 0, 1, 2 and 3 as shown in FIG. 3B.

As noise signal 102 obtained from noise source 101 is random, the order for becoming 0 or 1 is not decided. Further, signals are AC coupled, the probability for becoming 0 is equal to that for becoming 1. That is, it is possible to obtain 1-bit random data of good quality which is provided with uniformity and without periodicity.

This is 1-bit random data that can be realized using a simple level comparator.

Further, by using A/D converter 105 of not less than 2-bit accuracy, it is possible to obtain random number data having the frequency distribution of amplified noise signal 104 without less periodicity. For instance, if a noise generating factor of noise source 101 is of thermal noise, it is possible to obtain random number data having the probability for generating noises in the normal distribution state. Further, when random number data is prepared from the lower bits out of a plurality of bits composing an A/D converted digital value, it is possible to obtain random number data which does not depend on the shape of frequency distribution of amplified noise signal 104.

Further, for instance, when lower two bits only are used out of 12-bit random number data obtained using an A/D converter 105 having 12-bit accuracy, it is possible to obtain a 2-bit uniform random number having uniformity without periodicity.

As described above, in the physical random number generator in this embodiment of the present invention, it is devised to generate random number data 106 based on digital data obtained by amplifying noise signal 102 from noise source 101 caused by the random phenomenon up to the range of conversion of A/D converter 105 using AC coupling amplifier 103 and converting it into digital values 206 by A/D converter 105. It is therefore possible to obtain random number data having the noise generating probability distribution of noise source 101 or uniform distribution without periodicity.

Further, on the physical random number generator in this embodiment, as it is possible to obtain one random number data by one conversion operation by the A/D conversion of amplified noise signal instead of counting random pulses of the noise signal, it is possible to generate physical random numbers at a higher speed than the counting in the prior art.

Further, when A/D converter 105 having accuracy of 2 bits or more is used, random number data of multi-bits can be generated by one time of the A/D conversion, and thus it is possible to simplify the circuit configuration.

Next, a second embodiment of this invention will be described.

In the first embodiment, the frequency distribution when noise signal 102 obtained from random noise source 101 is converted to digital data 206 using AC coupling amplifier 103 and A/D converter 105 will become the normal distribution. In this case, even number data and odd number data are uniformly distributed around the mean value, and the even number and odd number frequency distributions of all bits composing converted digital value 206 become uniform.

However, there is the possibility for collapsing of this uniformity by the presence of an absolute value of the offset of an amplifier circuit or an A/D converter or the drift of the offset. To avoid this problem, in this embodiment, by adding an offset to cancel them so as to make the frequency distributions of odd and even numbers always uniform and to generate physical random numbers with ensured uniformity.

Figure 4:
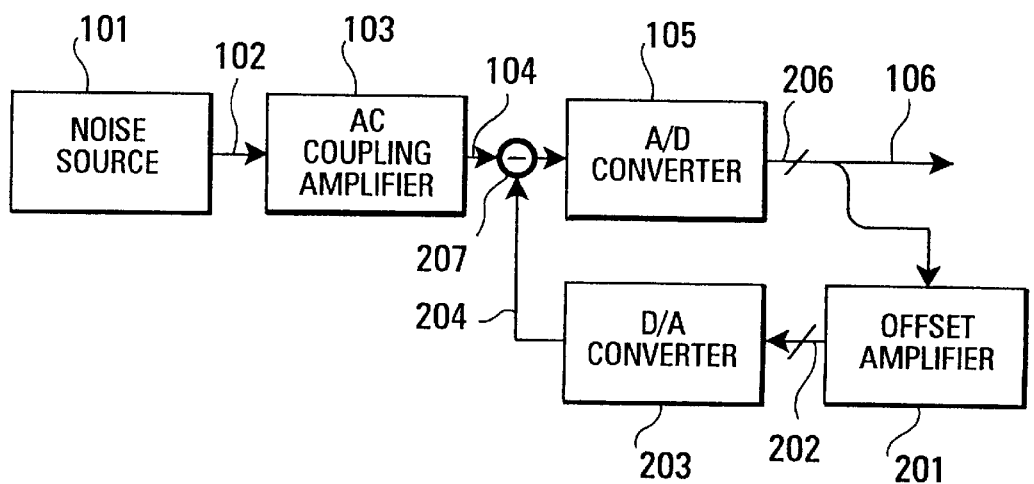
FIG. 4 is a block diagram showing the structure of a physical random number generator according to a second embodiment of the present invention.

FIG. 4 is a block diagram showing the structure of a physical random number generator according to a second embodiment of the present invention, and the same component elements as those shown in FIG. 1 are assigned with the same reference numerals and the explanations of them are omitted.

This physical random number generator is in the same structure as in the first embodiment, and is additionally provided with an offset detector 201 which outputs a digital offset adjusting signal 202 based on output 206 from A/D converter 105, a digital-to-analog converter (hereinafter referred to as D/A converter) 203 to D/A convert this signal 202 and output it as an analog offset adjusting signal 204 and a computing unit 207 to subtract the same from amplified noise signal 104. As described above, it has the offset adjusting function by analog signal.

Next, the operation of the physical random number generator in the above-described structure according to this embodiment of the present invention will be described.

As described in the first embodiment, offset component (DC component) of amplified noise signal 104 is made small by using AC coupling amplifier 103. However, unless this offset component becomes the same value as the offset component of A/D converter 105 itself, a mean value of the frequency distribution does not become 0. That is, the presence of the offset component changes the probability for MSB (Most Significant Digit) of a multi-bit A/D converter becoming 0 and 1, and thus, an error is produced in uniformity.

Further, it is anticipated that a deviation from the normal distribution may be generated by very little other noise components. So, the uniformity of random number data is improved by adjusting a mean value of the normal distribution and the offset of A/D converter 105 itself so that they agree with each other.

Further, as the deviations from the offset and the normal distribution are very little and may possibly be changed according to temperature and other environmental conditions, it is necessary to adjust them automatically. In this embodiment, an analog system is adopted as the method of this automatic adjustment, and this automatic adjusting functional portion operates as described below.

First, a mean value of digital values 206 converted by A/D converter 105 is obtained by offset detector 201 and thus, an offset amount between amplified noise signal 104 and A/D converter 105 is detected.

Digital offset adjusting signal 202 is output from offset detector 210 based on the detected offset amount.

Then, digital offset adjusting signal 202 is D/A converted by D/A converter 203 and is output as analog offset adjusting signal 204.

Analog offset adjusting signal 204 is input to computing unit 207, wherein adjusting signal 204 is subtracted from amplified noise signal 104. The output of computing unit 207 is applied to A/D converter 105, and thus an offset amount is adjusted automatically to zero.

As described above, the physical random number generator in this embodiment of the present invention is in the same structure as in the first embodiment, and is additionally provided with an offset automatic adjusting function composed of offset detector 201, D/A converter 203 and computing unit 207. Therefore, the same effects as those in the first embodiment are obtained, and in addition, it is possible to generate physical random numbers with ensured uniformity so as to make odd and even number frequency distributions always uniform by canceling various offsets and offset drifts, etc. of an amplifier circuit and the A/D converter and the like.

Next, a third embodiment of this invention will be described.

Figure 5:
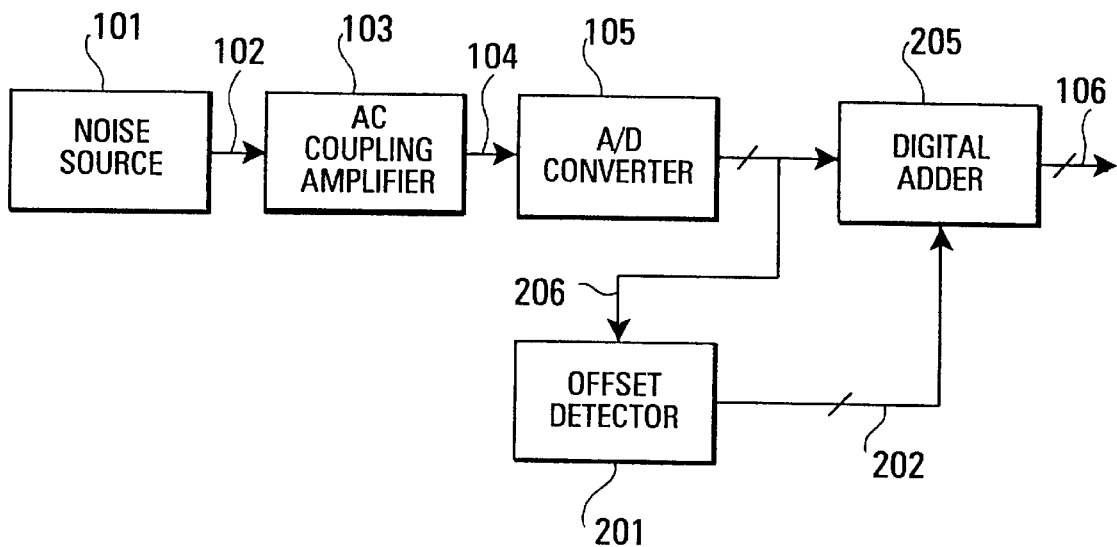
FIG. 5 is a block diagram showing the structure of a physical random number generator according to a third embodiment of he present invention.

FIG. 5 is a block diagram showing the structure of a physical random number generator according to a third embodiment of the present invention, and the same component elements as those shown in FIGS. 1 and 2 are assigned with the same reference numerals and the explanations of them are omitted.

In this embodiment, the offset automatic adjusting function as in the second embodiment is digitally realized.

This physical random number generator is in the same structure as in the first embodiment, and is additionally provided with the same offset detector 201 as in the second embodiment and a digital adder 205 to add digital offset adjusting signal 202 from offset detector 201 and output 206 from A/D converter 105 and to output the sum as random number data 106. As described above, it has the offset adjusting function using digital signal.

In the physical random number generator in such the structure as described above according to this embodiment of the present invention, digital offset adjusting signal 202 is output from offset detector 201 likewise the offset adjustment by analog signal in the second embodiment. This adjusting signal 202 is added to converted digital value 206 from A/D converter 105 by digital adder 205, and the offset amount is thus automatically adjusted.

As described above, the physical random number generator in this embodiment of the present invention is in the same structure as in the first embodiment, and is additionally provided with the automatic offset adjusting function composed of offset detector 201 and digital adder 205. It is therefore possible to obtain the same effects as in the first and the second embodiments. In addition, it is possible to prevent the increase in the number of component parts by using analog circuit as in the second embodiment, and the bringing of offset voltage fluctuating element of the offset applying circuit itself as in the second embodiment.

Further, as the digital process is also executed in the offset automatic adjusting function, it does not depend on the temperature characteristic. Furthermore, the digital circuit can be easily made in a small size through the large scale integration, etc. and is favorable in downsizing.

Next, a fourth embodiment of this invention will be described.

In the physical random number generator in the first embodiment, when the A/D conversion is made without making the offset adjustment, and if there are offset drift and gain fluctuation of the amplifier and the AD converter or the noise level fluctuation of the noise source, upper bits of A/D converter are especially affected largely.

According to the result of the simulation conducted, bit data at the fifth and the subsequent bits are able to maintain uniformity even when there are some drift and fluctuation.

So, in this embodiment, using an A/D converter having accuracy of 6 bits or more and making not less than two bits data at the fifth and the subsequent bits from the MSB as random number data, random number data maintaining uniformity of even/odd number generating frequency of each bit is generated.

Figure 6:
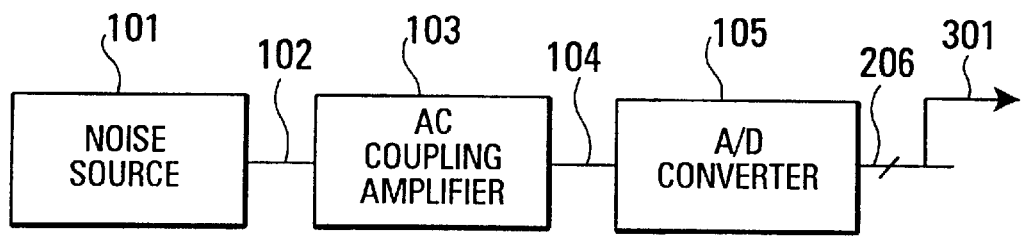
FIG. 6 is a block diagram showing the structure of a physical random number generator according to a fourth embodiment the present invention.

FIG. 6 is a block diagram showing the structure of the physical random number generator according to the fourth embodiment, and the same component elements as those shown in FIG. 1 are assigned with the same reference numerals and their explanations are omitted.

The physical random number generator in this embodiment is in such structure that an A/D converter having accuracy of 6 bits or more is used as A/D converter 105 and not less than two bits data at the fifth and the subsequent bits from MSB are taken out as a random number data 301.

Next, the operation of the physical random number generator in the structure as described above in this embodiment of the present invention will be described.

Figure 7:
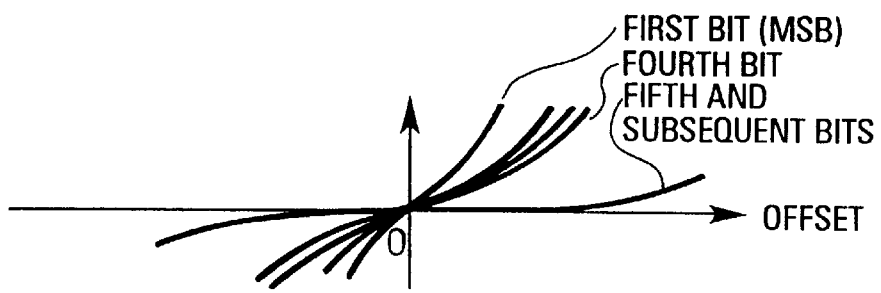
FIG. 7 is a diagram showing the result of simulation conducted relative to uniformity against offset and gain fluctuation.
Figure 7:
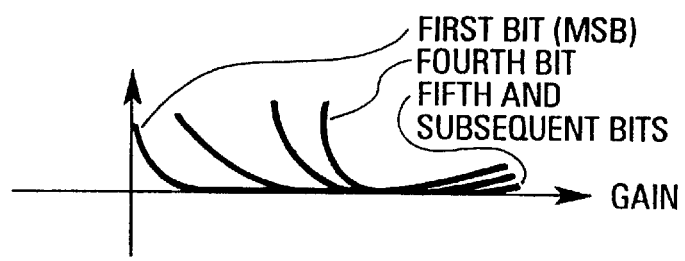

FIG. 7 is a diagram showing the results of the simulations conducted with respect to uniformities of offset and gain fluctuations.

First, FIG. 7(a) shows the change in uniformity for the fluctuation of offset. As shown in this figure, the offset is changed by about ±10% against the range of conversion of A/D converter 105, and the frequency for becoming 0 or 1 is checked for each bit composing converted digital value 206. The result is that the higher a bit is, the larger a deviation in uniformity for offset is.

On the other hand, FIG. 7(b) shows the change in uniformity for fluctuation of gain. It is assumed that amplified noise signal 104 is distributed in the standard normal distribution, and gain is changed and the conversion range of A/D converter 105 is set at ±6σ to ±σ. (Here, σ designates standard deviation.) At this time, the frequency of each of bits composing converted digital value 206 for becoming 0 or 1 is checked. The result is that the higher a bit is, the larger a deviation in uniformity for gain fluctuation is, as shown in this figure.

In the physical random number generator in this embodiment, data of the fifth and the subsequent bits from the MSB of converted digital value 206 are taken out as random number data 301 based on the above information.

As described above, the physical random number generator in this embodiment of the present invention is in the same structure as in the first embodiment, and in addition, is so devised as to adopt the fifth and subsequent bits from the MSB as random number data 301, and therefore, the same effects as in the first embodiment are obtained and further, random number data of better uniformity can be obtained.

Next, a fifth embodiment of this invention will be described.

In this embodiment, a technique to maintain uniformity of frequency for generating even and odd numbers of each bit by clarifying the range of conversion of an A/D converter for the noise distribution of a noise source according to the result of simulation conducted with respect to uniformity of frequency of generating even and odd numbers of each bit.

Figure 8:
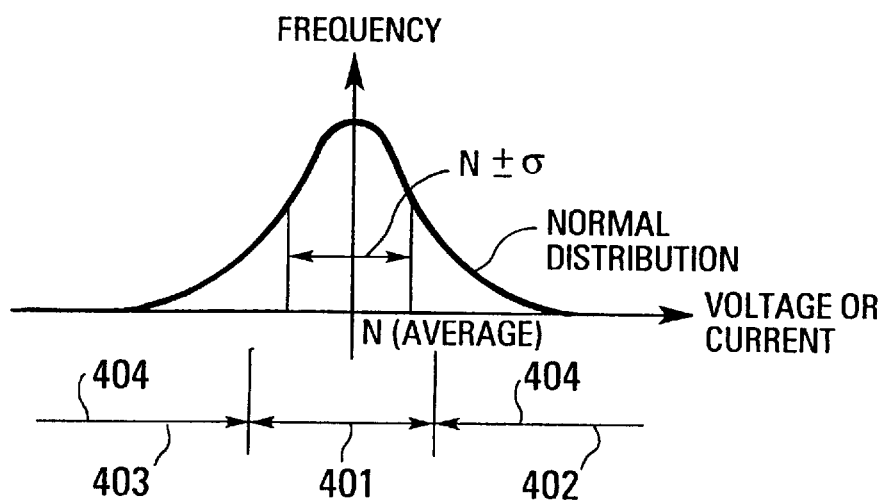
FIG. 8 is a diagram showing the result of simulation conducted for deciding the range of A/D conversion in a physical random number generator according to a fifth embodiment of the sent invention.

FIG. 8 is a diagram showing the result of the simulation conducted to decide the range of A/D conversion in the physical random number generator according to the fifth embodiment of the present invention. Further, this embodiment is applicable to a physical random number generator in the same structure as in the first embodiment shown in FIG. 1.

In FIG. 8, the relationship between the frequency distribution of converted digital value 206 and a conversion range of A/D converter 105 in this embodiment is shown. In this figure, there are an overflow range 402 and an underflow range 403 at both sides of a conversion range 401 of A/D converter 105 of more than N±σ. These ranges 402 and 403 compose an over range 404.

In the physical random number generator in this embodiment, conversion range 401 of A/D converter 105 is set as described above. It uses the fifth and subsequent bits of converted digital value 206 for random number data as in the fourth embodiment, and all others are in the same structure as in the first embodiment.

Here, to make gain large corresponds to make the conversion range narrow for the frequency distribution. When gain is made large, the change around a mean value can be regarded to become small relatively, and therefore, the change in uniformity for fluctuation of the offset becomes small and higher bits can be adopted as random number data.

However, in this case as the probability for amplified noise signal 104 shown in FIG. 1 to exceed the conversion range of A/D converter 105 becomes high, the random number generating efficiency decreases. The degree of decrease follows the probability distribution of converted digital value 206, and in case of the normal distribution, a loss of about 30% is caused when the conversion range of A/D converter 105 is N±σ against amplified noise signal 104.

Therefore, a gain is reduced so that the conversion range becomes larger than N±σ. As for the fall of uniformity of the higher (MSB side) bits caused when the gain is reduced (see FIG. 7(b)) is coped with by using the fifth and subsequent bits of converted digital value 206 of which uniformities are not dropped.

As described above, the physical random number generator in this embodiment of the present invention is in the same structure as in the first and fourth embodiments, and in addition, conversion range 401 of A/D converter 105 for the noise distribution of noise source 101 is set at above N±σ. Therefore, it is possible to obtain the same effects as those in the first and fourth embodiments, and in addition, to maintain uniformity of the frequency to generate even and odd numbers of each bit more certainly.

Next, a sixth embodiment of this invention will be described.

In this embodiment, it is devised to obtain random numbers having higher uniformity by previously defining conversion range 401 shown in FIG. 8 of A/D converter 105 likewise the fifth embodiment. That is, this embodiment provides a concrete handling of a noise signal when it exceeds the conversion range of A/D converter 105.

If the noise signal exceeds conversion range 401, a digital data value that is output from A/D converter 105 is not guaranteed. In this case, the bit pattern composing data that is output when the noise signal exceeds conversion range may possibly be fixed, and the correlation between bits is affected remarkably when multi-bit data is made a random number data.

So, in this embodiment, the data that is output when the noise signal exceeds conversion range 401 is regarded to have no randomness and is excluded from the random number generation.

Figure 9:
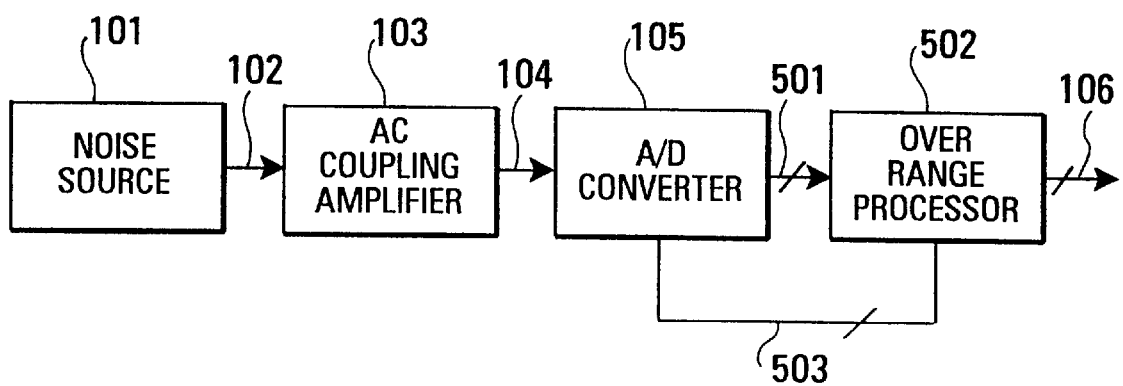
FIG. 9 is a block diagram showing the structure of a physic random number generator according to a sixth embodiment of the present invention.

FIG. 9 is a block diagram showing the structure of the physical random number generator according to the sixth embodiment of the present invention. The same component elements as those shown in FIG. 1 are assigned with the same reference numerals and their explanations are omitted.

This physical random number generator is provided with an over range processor 502 to output converted digital values 501 only within conversion range 401 as random number data 106 based on converted digital value 501 and an over range signal 503 from A/D converter 105, and all others are in the same structure as in the first embodiment.

In the physical random number generator in such the structure, if amplified noise signal 104 exceeds the conversion range of A/D converter 105, over range signal 503 is firstly generated from A/D converter 105.

By over range processor 502 which has received this over range signal 503, A/D converted digital values 501 are processed and converted digital values 501 in over range 404 are removed from random number data 106. Here, the concrete processing contents of over range processor 502 differ depending on the throughput of random number data 106.

When, for instance, it is required to output random number data 106 at a fixed speed, such a buffer as an FIFO (First In First Out) memory is built in over range processor 502, and random number data 106 is output so as not to lack any data output caused by the over range processing.

In this case, the random number data throughput becomes slower than the data conversion speed of A/D converter 105. The ratio of the becoming slower is determined by the frequency distribution of noise signal 104 when it is A/D converted.

If it is not required to output random number data at a fixed velocity, for instance, when the handshaking is made in the input/output of random number data 106, the data output is held suspended until valid random number data is obtained.

As described above, as the physical random number generator in this embodiment of the present invention is made in the same structure as in the first embodiment, and in addition, is so designed as to output converted digital value 501 only within conversion range 401 as random number data 106 by over range processor 502, it is possible to obtain the same effects as in the first embodiment and further to maintain the uniformity in the frequency to generate even and odd numbers of each bit more certainly. That is, data that is output when the noise signal exceeds conversion range 401 is regarded to have no randomness and is excluded from the random number generation, and thus, the quality of generated random numbers can be improved.

Next, a seventh embodiment of this invention will be described.

In this embodiment, the drop of uniformity caused by the differential nonlinearity is improved (i.e. increased) by performing the conversion operation at various positions relative to the conversion range of A/D converter 501.

The differential nonlinearity of a high speed A/D converter is at the worst ±0.5 LSB (Least Significant Bit). For instance, an A/D converter of 10-bit accuracy is capable of converting a voltage of 1.024V into digital values by dividing it into 1024. But due to the effect of the differential nonlinearity, the voltage between conversion results N and N+1 does not become 1 mV (1.024V/1024) exactly and becomes a value between 0.5 mV to 1.5 mV depending on conversion result N. This will result in the drop of uniformity when the result of A/D conversion is used random number data.

So, in this embodiment, the physical random number generator is added with a mechanism which performs the A/D conversion of an analog signal after adding a known voltage to the analog signal and then subtracts from the converted digital signal the same digital value as the value added to the analog signal, by utilizing the fact that differential nonlinearity depends on conversion result N.

Figure 10:
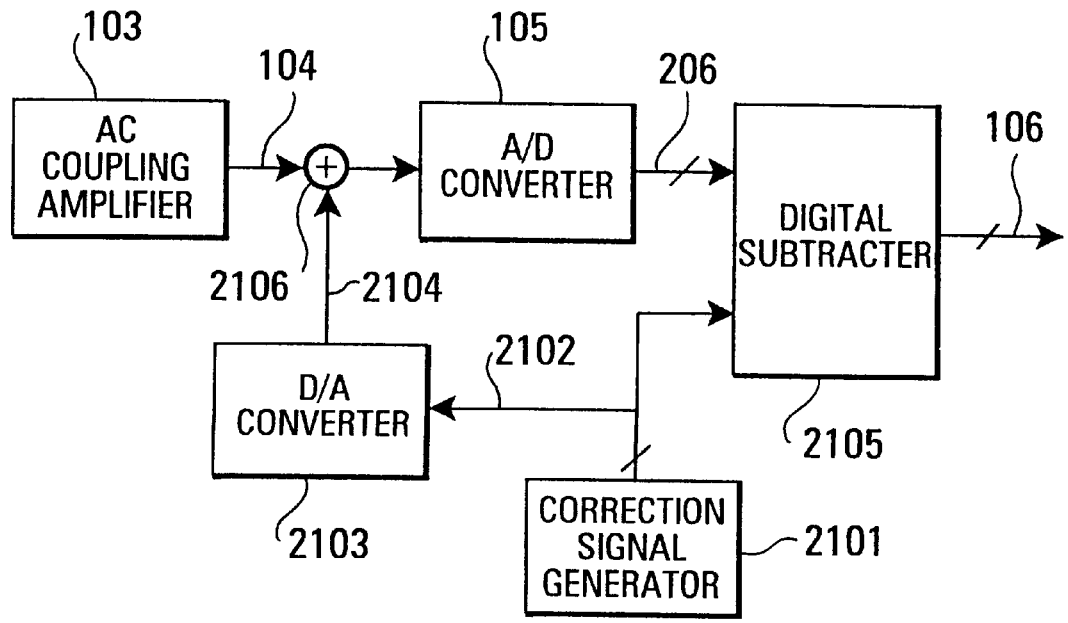
FIG. 10 is a block diagram showing the structure of a physical random number generator according to a seventh embodiment of the present invention.

FIG. 10 is a block diagram showing the structure of the principal part of a physical random number generator according to the seventh embodiment of the present invention.

This physical random number generator is in such structure that an analog correction signal 2104 is added to the input of A/D converter 105 and a digital correction signal 2102 is subtracted from the output of A/D converter 105 and all others are in the same structure as in one of the first through the sixth embodiments. For this purpose, the physical random number generator is provided with an correction signal generator 2101, a D/A converter 2103, an adder 2106 and a digital subtracter 2105.

In the physical random number generator in such the structure, digital correction signal 2102 is first generated by correction signal generator 2101. This digital correction signal 2102 is converted into analog correction signal 2104 by D/A converter 2103 and added to amplified noise signal 104. This added value is applied to A/D converter 105 and is converted into digital value 206.

Further, digital correction signal 2102 is input to digital subtracter 2105 and subtracted from digital value 206, and random number data 106 is thus obtained.

As described above, in the physical random number generator in this embodiment of the present invention, as a known voltage is added to an analog signal, the A/D conversion is made and the same digital value as the value added to the analog signal is subtracted therefrom, it becomes possible to obtain the same effect as in one of the first through the sixth embodiments. In addition, it is possible to obtain the same value as random number data 106 while changing a value of conversion result N of A/D converter 105, and thus, it becomes possible to level differential nonlinearity depending on the conversion result N and to improve uniformity of random numbers.

Next, an eighth embodiment of this invention will be described.

This embodiment is to improve the drop of uniformity caused by differential nonlinearity of A/D converter 105 likewise the seventh embodiment. That is, the basic principle to reduce the effect by the differential nonlinearity in this embodiment is the same as that in the seventh embodiment. When converting the same analog voltage into digital value, the drop of uniformity depending on conversion result N is improved by generating a different value.

Figure 11:
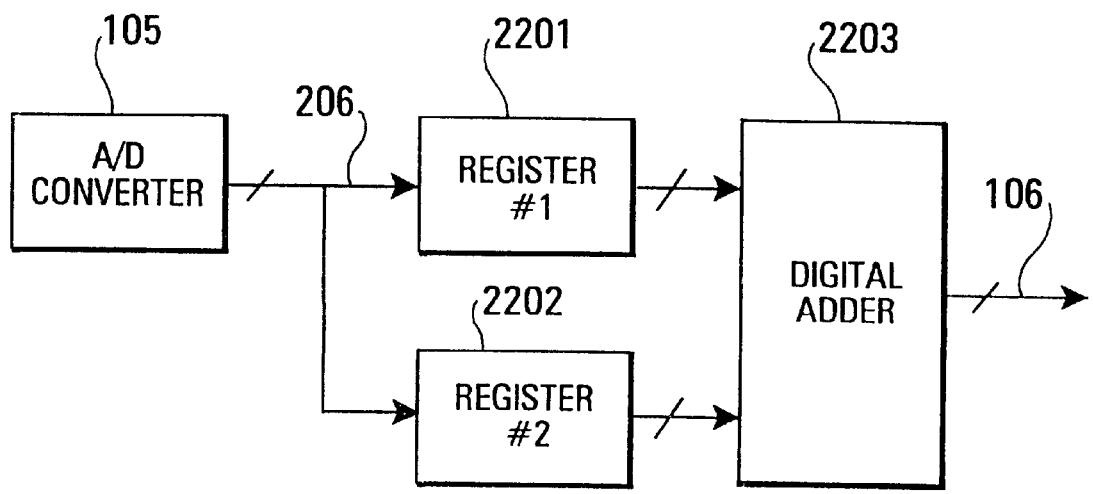
FIG. 11 is a block diagram showing the structure of a physical random number generator according to an eighth embodiment of the present invention.

FIG. 11 is a block diagram showing the structure of the principal part of a physical random number generator according to the eighth embodiment of the present invention. This physical random number generator is provided with a register (#1) 2201 and a register (#2) 2202 to store the output of A/D converter 105 and a digital adder 2203 to add values of both registers 2201 and 2202, and all others are in the same structure as in one of the first through sixth embodiments.

In the physical random number generator in such the structure, digital values 206 converted by A/D converter 105 are recorded in registers 2201 and 2202 alternately.

Then, an added average of the outputs of registers 2201 and 2202 is obtained by digital adder 2203 and is output as random number data 106.

As described above, in the physical random number generator in this embodiment of the present invention, as an added average of digital values 206 converted alternately is obtained and used as random number data 106, it is possible to obtain the same effect as that in one of the first through the sixth embodiment. In addition, it is possible to improve the drop of random number uniformity depending on conversion result N and to reduce the effect of differential nonlinearity.

Thus, it becomes possible to make the probability for bits becoming 1 or 0 uniform by adding A/D converted digital values 206. That is, by making a value to be added to a random value, it becomes possible to improve the drop of uniformity depending on conversion result N.

But, in the physical random number generator in the structure shown in FIG. 11, the frequency for generating random number data 106 becomes a half of the conversion frequency of A/D converter 105.

So, as a method to prevent the drop of the generating frequency of random number data 106, for instance, a digital value that is converted by another A/D converter (not shown) using another system of noise source may be used as a value to be input to register 2202.

Furthermore, pseudo random numbers generated from a pseudo random number generator (not shown) may be used as a value to be input to register 2202.

Further, unless multiple bits are used as random number data, uniformity can be improved by connecting periodic digital values to register 2202 and adding in digital adder 2203 (Exclusive OR).

Next, a ninth embodiment of this invention will be described.

In this embodiment, as a noise source that is usable in any of the above-mentioned first through the eighth embodiments, a noise source in which the frequency distribution in the A/D conversion follows the normal distribution will be described. This embodiment utilizes thermal noise, which is caused by statistical events and the fluctuation of thermal noise becomes the normal distribution.

Figure 12:
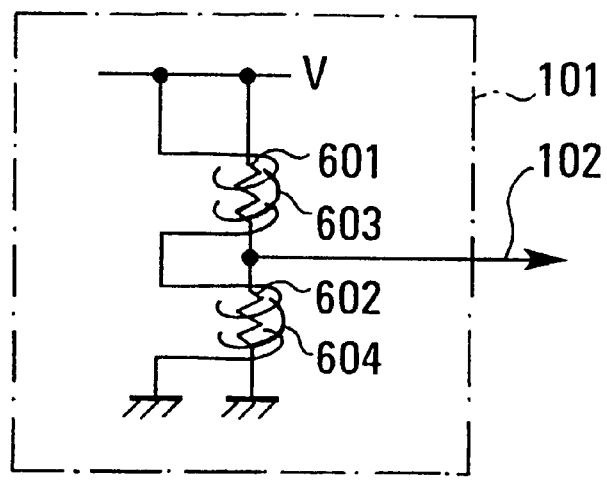
FIG. 12 is a block diagram showing one example of a noise source in a physical random number generator according to a ninth embodiment of the present invention.

FIG. 12 is a block diagram showing one example of a noise source in a physical random number generator according to the ninth embodiment of the present invention. Further, this noise source 101 is applied to any of the physical random number generators shown in the first through the eighth embodiments.

This noise source 101 utilizes thermal noise of resistors. In noise source 101, resistors 601 and 602 are connected in series and earthed from a power source V. Similarly, heaters 603 and 604 are connected in series and earthed from power source V. Further, these heaters 603 and 604 are arranged to heat resistors 601 and 602, respectively, and noise signal 102 is output from the connection point of resistors 601 and 602.

As thermal noise of resisters is small, resistors 601 and 602 are respectively heated by heaters 603 and 604 to make thermal noise large. Furthermore, as the temperature of resistors 601 and 602 are kept at a fixed level, stabilized noise signal 102 is obtained.

As described above, in the physical random number generator in this embodiment of the present invention, as the above-described noise source is used, it is possible to obtain random number data having high uniformity of even and odd number generating frequency based on the stabilized noise signal.

Next, a tenth embodiment of this invention will be described.

In this embodiment, likewise the ninth embodiment, a noise source that is usable in any of the first through the eighth embodiments will be described. In this embodiment, thermal noise is also utilized.

Figure 13:
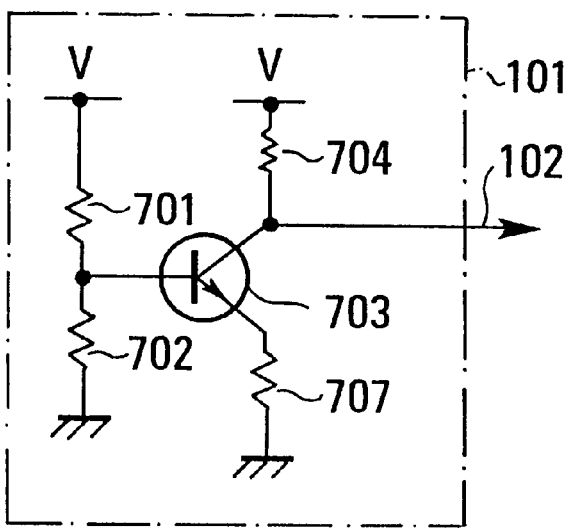
FIG. 13 is a block diagram showing one example of a noise source in a physical random number generator according to a tenth embodiment of the present invention.

FIG. 13 is a block diagram showing one example of a noise source in a physical random number generator according to the tenth embodiment of the present invention. Further, this noise source 101 is applied to any of the physical random number generators shown in the first through the eighth embodiments.

This noise source 101 uses a transistor, as an example of a semiconductor device. In noise source 101, a transistor 703 is connected to a connection point of resistors 701 and 702 connected in series between a power source V and an earth. Thus, bias is applied to transistor 703, and further, a resistor 704, transistor 703 and a resistor 707 are connected in series between power source V and the earth. Noise signal 102 is output from a connection point of resistor 704 and transistor 703 by utilizing thermal noise of transistor 703 generated at both ends of resistor 704.

As described above, in the physical random number generator in this embodiment of the present invention, as the above-described noise source is used, it is possible to obtain random number data having high uniformity of even and odd number generating frequency based on the stabilized noise signal.

Next, an eleventh embodiment of this invention will be described.

In this embodiment, likewise the ninth embodiment, a noise source that is usable in any of first through eighth embodiments is described. In this embodiment, thermal noise is also utilized.

Figure 14:
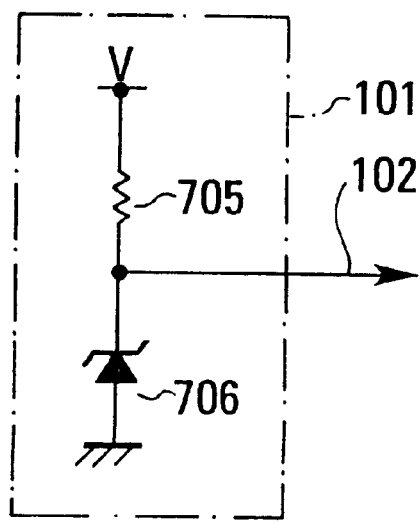
FIG. 14 is a block diagram showing one example of a noise source in a physical random number generator according to an eleventh embodiment of the present invention.

FIG. 14 is a block diagram showing one example of a noise source in a physical random number generator according to the eleventh embodiment of the present invention. Further, this noise source 101 is applied to any of the physical random number generator shown in the first through the eighth embodiments.

This noise source 101 uses a Zener diode, as another example of a semiconductor device. A resistor 705 and a Zener diode 706 are connected in series between power source V and the earth, and noise signal 102 is output from a connection point of them.

When a Zener diode is used, by flowing Zener current to Zener diode 706 through resistor 705, thermal noise generated at both ends of resistor 705 is utilized. As a circuit to flow current to Zener diode 706, for instance, a constant current circuit may be used instead of resistor 705.

As described above, in the physical random number generator in this embodiment of the present invention, as the above-described noise source is used, it is possible to obtain random number data having high uniformity of even and odd number generating frequency based on the stabilized noise signal.

Next, a twelfth embodiment of this invention will be described.

In this embodiment, likewise the ninth embodiment, a noise source that is usable in any of the first through the eighth embodiments is described. In this embodiment, thermal noise is also utilized.

Figure 15:
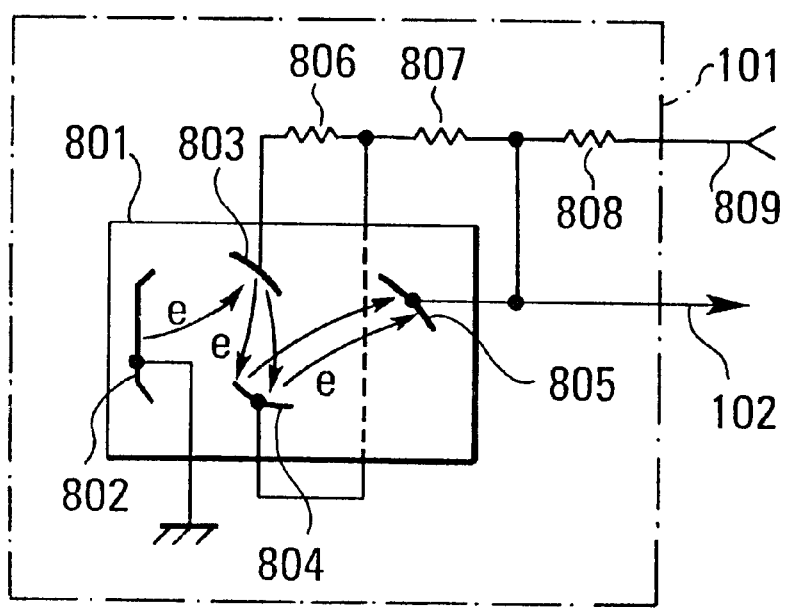
FIG. 15 is a block diagram showing one example of a noise source in physical random number generator according to a twelfth embodiment of the present invention.

FIG. 15 is a block diagram showing one example of a noise source in a physical random number generator according to the twelfth embodiment of the present invention. Further, this noise source 101 is applied to any of the physical random number generator shown in the first through the eighth embodiments.

This noise source 101 utilizes a photomultiplier and as shown in FIG. 15, it is composed of a photomultiplier 801, bias applying resistors 806, 807 and 808 and a high voltage power source 809.

Photomultiplier 801 multiplies electrons after converting light into electron.

When a light strikes a photoelectric surface 802 of photomultiplier 801, electrons are generated therefrom. The generated electrons collide against a high potential electrode 803 and more electrons are generated by the collision of electrons against electrode 803. The generated electrons collide against a further higher potential electrode 804.

By repeating such multiplication of electrons, electrons collide against a last electrode 805. From the number of electrons reached this stage, quantity of extremely weak light incident on photoelectric surface 802 can be known, and noise signal 102 is obtained therefrom.

Even when photoelectric surface 802 is shielded, noise signal 102 is generated from the output of photomultiplier 801 by thermions existing on photoelectric surface 802. Normally, the thus generated noise is referred to as dark current, which becomes the lower limit when measuring a light quantity, and it is regarded that the smaller, the better. But as it is a noise caused from thermal noise, it can be utilized as a noise source of physical random numbers.

As described above, in the physical random number generator in this embodiment of the present invention, as the above-described noise source is used, it is possible to obtain random number data having high uniformity of even and odd number generating frequency based on the stabilized noise signal.

Next, a thirteenth embodiment of this invention will be described.

In this embodiment, likewise the ninth embodiment, a noise source usable in any of the first through the eighth embodiments is described. In this embodiment, thermal noise is also utilized.

Figure 16:
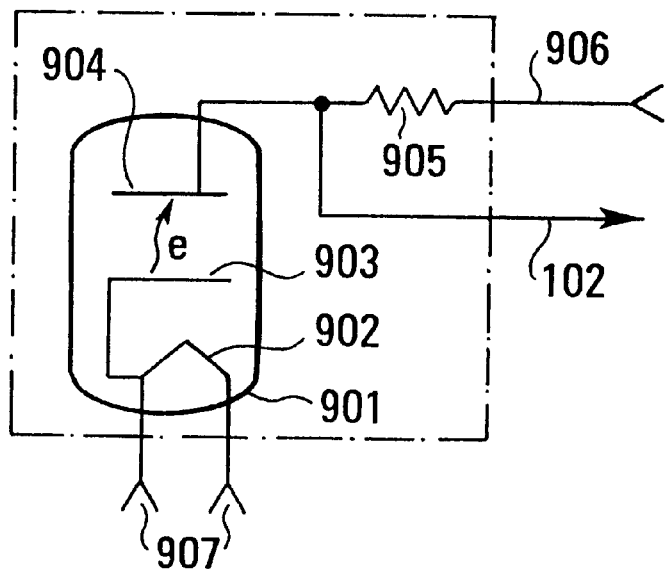
FIG. 16 is a block diagram showing one example of a noise source in a physical random number generator according to a thirteenth embodiment of the present invention.

FIG. 16 is a block diagram showing one example of a noise source in a physical random number generator according to the thirteenth embodiment of the present invention. Further, this noise source 101 is applied to any of the physical random number generator shown in the first through the eighth embodiments.

This noise source 101 utilizes a vacuum tube, and it is composed such that a high voltage power source 906 is connected to a bipolar vacuum tube 901 via a bias applying resistor 905 and a heater power source 907 is connected to bipolar vacuum tube 901.

In bipolar vacuum tube 901, thermions are generated when heating an electrode 903 by a heater 902, and the generated electrons reach a high potential electrode 904. Quantity of electrons flown from electrode 903 to electrode 904 is obtained by measuring a voltage between both ends of resistor 905.

The obtained current value has a fluctuation caused by thermal noise, and this fluctuation is used as noise signal 102. Here, it is desirable to use a DC power source for heater power source 907 that is used here so as to avoid an effect of AC noise.

As described above, in the physical random number generator in this embodiment of the present invention, as the above-described noise source is used, it is possible to obtain random number data having high uniformity of even and. odd number generating frequency based on the stabilized noise signal.

Next, a fourteenth embodiment of this invention will be described.

In this embodiment, likewise the ninth embodiment, a noise source usable in any of the first through the eighth embodiments is described. In this embodiment, thermal noise is also utilized.

Figure 17:
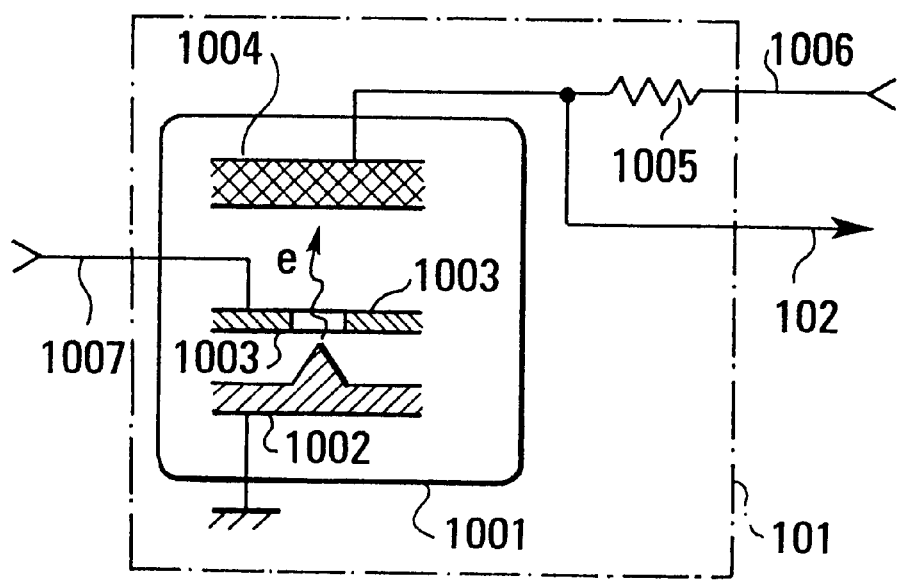
FIG. 17 is a block diagram showing one example of a noise source in a physical random number generator according to a fourteenth embodiment of the present invention.

FIG. 17 is a block diagram showing one example of a noise source in a physical random number generator according to the fourteenth embodiment of the present invention. Further, this noise source 101 is applied to any of the physical random number generator shown in the first through the eighth embodiments.

This noise source 101 utilizes a vacuum microelement, and it is composed such that a high voltage power source 1006 is connected to a vacuum microelement 1001 via a bias applying resistor 1005 and a control power source 1007 is connected to vacuum microelement 1001.

In vacuum microelement 1001, an electrode 1003 is arranged near an earthed electrode 1002. When the electric field is applied to this electrode 1003 from control power source 1007, electrons are generated from electrode 1002 by the tunnel effect. The generated electrons move toward electrode 1003 and are attracted by a higher potential electrode 1004 that is arranged so as to sandwich electrode 1003 with electrode 1002. Thus, current flows between electrodes 1002 and 1004 and is measured as a voltage between both ends of resistor 1005. The current value thus obtained has fluctuation resulting from the statistically generating tunnel effect and this fluctuation is used as noise signal 102.

As described above, in the physical random number generator in this embodiment of the present invention, as the above-described noise source is used, it is possible to obtain random number data having high uniformity of even and odd number generating frequency based on the stabilized noise signal.

Next, a fifteenth embodiment of this invention will be described.

This embodiment is applicable to the noise source in any of the ninth through the thirteenth embodiments for stabilizing the noise signal from the noise source.

That is, thermal noise fluctuates in proportion to the square root of absolute temperature, and signal level generated from the noise source is fluctuated by the effect of ambient temperature. This embodiment is to prevent this fluctuation.

Further, the fluctuating component of the vacuum microelement shown in the fourteenth embodiment is caused due to the tunnel effect and so on and is not affected by temperature. The effect of making constant temperature by this method is not obtainable and it is therefore excluded here.

Figure 18:
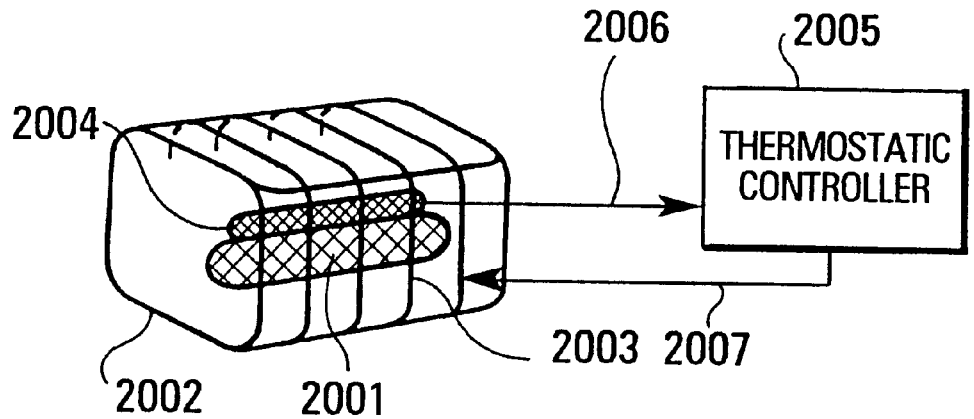
FIG. 18 is a block diagram showing one example of a thermotatic device for a noise source in a physical random number generator according to a fifteenth embodiment of the present invention.

FIG. 18 is a block diagram showing one example of a noise source thermostatic device in a physical random number generator in the fifteenth embodiment of the present invention.

In this noise source thermostatic device, a noise source element 2001 is housed in a thermostatic case 2002. Thermostatic case 2002 has built in a heater 2003, and the temperature therein is controlled to a constant level by a thermostatic controller 2005. Further, noise source element 2001 is an element portion of the noise source used in any of noise sources 101 in the ninth through thirteenth embodiments.

Temperature of noise source element 2001 is measured by a resistance temperature sensor 2004, and the measured temperature is applied to thermostatic controller 2005 as a temperature signal 2006. Thermostatic controller 2005 controls a heater heating signal 2007 according to temperature signal 2006 and controls heater heating power applied to heater 2003 so that the temperature of noise source element 2001 becomes constant.

As a temperature to be controlled at a constant level, a temperature lower than the operating limit temperature of noise source element 2001 and higher than the environmental temperature is selected. For instance, it is assumed that an ambient temperature of a computer is 25° C., an ambient temperature of the physical random number generator is 35° C. and an upper limit operating temperature of noise source element 2001 is 55° C. Furthermore, it is assumed that the ambient temperature of the computer changes by ±5° C. by the air conditioning and the ambient temperature of the physical random number generator rises up to maximum 40° C. If a value of temperature to be controlled is set at 45–50° C., it is possible to control the temperature of noise source element 2001 at a constant level only by heater 2003 without incorporating the cooling apparutus.

As described above, in the physical random number generator in this embodiment of the present invention, as the temperature of its noise source 101 is maintained at a constant level by the noise source thermostatic device, it is possible to prevent the fluctuation of the noise level. Furthermore, it is possible to generate thermal noise easily and make cooling apparatus unnecessary by maintaining the temperature at a high temperature and at a constant level.

Next, a sixteenth embodiment of this invention will be described.

In a sixteenth through a twenty-third embodiments, devices utilizing the physical random number generator described in the first through the fifteenth embodiments will be described.

Figure 19:
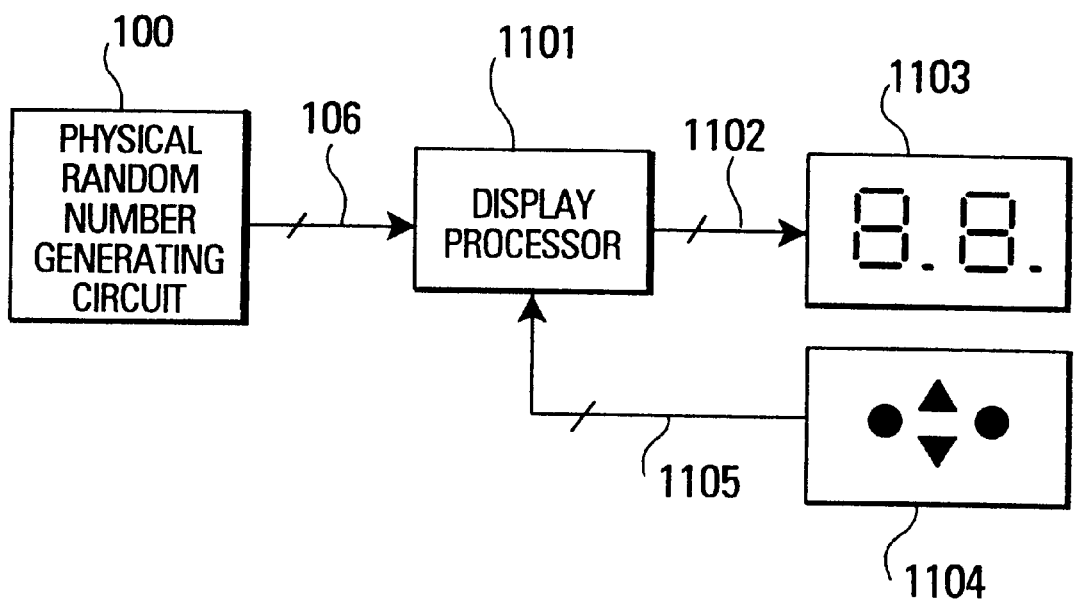
FIG. 19 is a block diagram showing the structure of a physical random number display device using a physical random number generator according to a sixteenth embodiment of the present invention.

FIG. 19 is a block diagram showing the structure of a display device using the physical random number generator according to a sixteenth embodiment of the present invention.

In this display device, random number data 106 from a physical random number generating circuit 100 is input to a display processor 1101, and further, a display data 1102 from this display processor 1101 is displayed on a display unit 1103.

Display processor 1101, under the control of a control panel 1104, based on inputted random number data 106 outputs display data 1102 to display unit 1103.

There are buttons, etc. provided on control panel 1104 and the result of pushing the buttons is input to display processor 1101 as a control signal 1105.

Physical random number generating circuit 100 is in the same structure as any of the physical random number generators described in the first through the fifteenth embodiments.

Further, a various random number generating function is incorporated in a random number output portion that is composed of physical random number generating circuit 100 and display processor 1101. The various random number generating function is, for instance, to change a range of values of uniform random number data 106 by changing the number of bits of A/D converter 105 and to choose out of random number data 106 received by display processor 1101.

The operation of the display device using the physical random number generator in such structure will be described.

For instance, a case to generate numbers of a die in terms of random numbers is considered. First, the random number generating function is changed over to the die mode with four buttons provided on control panel 1104.

Here, values of 0 to 7 can be generated using 3-bit uniform random number data 106. However, as a die has numbers of 1 through 6 only, a program is set in display processor 1101 so as to generate random numbers until one of values of 1 through 6 is generated when the value of 0 or 7 is generated.

Depress the button on control panel 1104 and start to generate random numbers. Display a value of generated random number on display 1103 so that the start of generation of random numbers can be seen. Then, stop the generation of random numbers by depressing the button and display a value of random number at that time on display unit 1103.

Then, a case to generate figures of a bingo game is considered. First. change over the random number generating function to the bingo mode by the buttons on control panel 1104. When numerical values that are not required for the bingo game are presented, it is processed in the same manner as in the case of the die. In the case of the bingo game, as the same values are to be generated only one time, it is necessary to remember the values once generated. Further, as a function to erase all values once generated when the game is over, in addition to the buttons for start/stop function of the bingo mode, a button having the reset function is also required. As one example, a value 88 is displayed on display unit 1103 as shown in FIG. 19

As described above, in the display device using the physical random number generator in this embodiment of the present invention, as physical random number generating circuit 100, display processor 1101 and control panel 1104 are provided, random numbers can be easily obtained and applied to various uses. For instance, it can be applied to such uses as preparation of the table of random numbers, imitation of the die, generation of figures of bingo game, and a lottery wheel, etc. By applying this display device to such uses, the mass production of noise sources and random number generating circuits becomes possible and the downsizing and low pricing of the display devices can be realized.

Next, a seventeenth embodiment of this invention will be described.

In this embodiment, a communication equipment using the physical random number generator will be described. As a communication method using random numbers, there is, for instance, a spectrum diffusion system. This system enables to make the communication without being known by a third person by the frequency modulation using random number data generated by the physical random number generator. For random numbers that are used for this purpose, random numbers with no periodicity but having uniformity are demanded. Pseudo random numbers have periodicity and uniformity is not perfect. Therefore, it is suited to use physical random numbers rather than pseudo random numbers.

Figure 20:
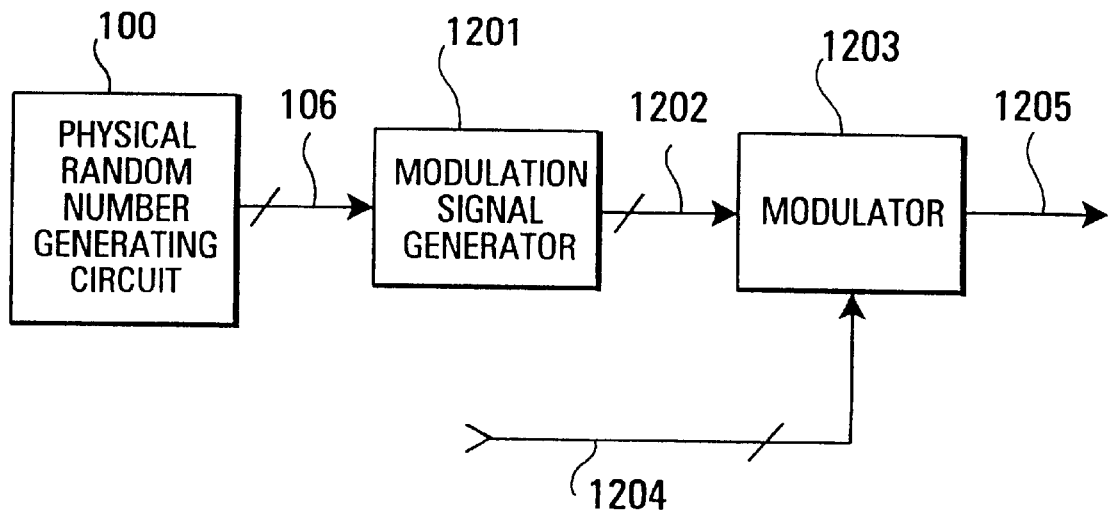
FIG. 20 is a block diagram showing the structure of a communication equipment using a physical random number generator according to a seventeenth embodiment of the present invention.

FIG. 20 is a block diagram showing the structure of a communication equipment using the physical random number generator according to the seventeenth embodiment of the present invention.

This communication equipment is composed of physical random number generating circuit 100, a modulation signal generator 1201 and a modulator 1203. Further, physical random number generating circuit 100 is in the same structure as any of the physical random number generators shown in the first through the fifteenth embodiments.

The communication equipment using the physical random number generator in such structure operates as shown below.

First, a modulation signal 1202 is generated in modulation signal generator 1201 based on random number data 106 from physical random number generating circuit 100. Then, a transmission data 1204 and modulation signal 1202 are modulated by modulator 1203 and transmission signal 1205 is prepared and transmitted.

In the communication system according to the spectrum diffusion system, modulation signals are prepared from such random number data. In case of the data communication, modulation signals must not be known by a third person, but it is necessary for those persons who make the communication to know modulation signals each other.

The role of modulation signal generator 1201 is to prepare modulation signals from random number data 106, retain them until new modulation signals are recognized by those who perform the communication, and update them to new modulation signals at the time when they are recognized.

As described above, in the communication equipment using the physical random number generator in this embodiment of the present invention, as physical random number data 106 from physical random number generating circuit 100 is used for the communication of the spectrum diffusion system, etc., it is possible to achieve the downsizing and low pricing of the communication equipment and surely secure the secrecy of the communication.

That is, in case of modulation signals, like pseudo random numbers, that are prepared according to a fixed rule, there is such a problem that modulation signals are once decoded, new modulation signals are easily estimated even when they are newly generated. In the case of physical random numbers, as there is no rule regarding periodicity and the order of generation, it is not easy to infer them even when once decoded.

Next, an eighteenth embodiment of this invention will be described.

In this embodiment, a data encoder using the physical random number generator is described. For instance, random number data is used to encode three characters of, such as ABC, and to replace with other three characters. Further, codes are used for fighting planes as an identification code to show friends each other. It is necessary to change such codes frequently so that they are not easily decoded by a third party.

Figure 21:
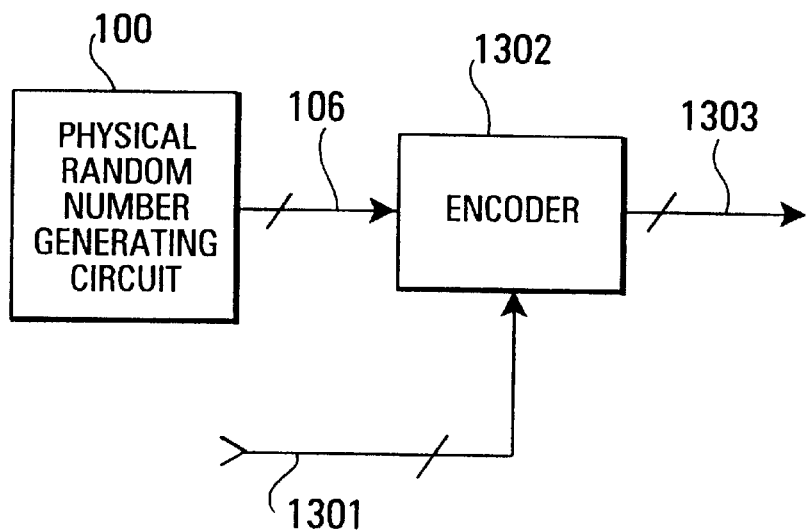
FIG. 21 is a block diagram showing the structure of a data encoder using a physical random number generator according to an eighteenth embodiment of the present invention.

FIG. 21 is a block diagram showing the structure of a data encoder using the physical random number generator according to the eighteenth embodiment of the present invention.

This data encoder is composed of physical random number generating circuit 100 and an encoder 1302. Physical random number generating circuit 100 is in the same structure as any of the physical random number generators described in the first through the fifteenth embodiments.

The data encoder using the physical random number generator in such structure operates as shown below.

Random number data 106 from physical random number generating circuit 100 are input to encoder 1302 together with original data 1301. In encoder 1302, coded data 1303 are prepared and output based on this original data 1301 and random number data 106.

As described above, in a data encoder using the physical random number generator in this embodiment of the present invention, as random number data 106 from the physical random number generating circuit 100 is used for encoding, it is possible to achieve downsizing and low pricing of a data encoder. It is also possible to eliminate such problems as periodicity, and the order of data generation, etc. by using random number data 106 as the code for encoding and to improve the secrecy of encoding.

Further, when pseudo random numbers are used as before, there are problems regarding periodicity and uniformity. That is, random number data generated using a well-known pseudo random number generating technique has been completely studied. Accordingly, it becomes possible to infer the entire random number series from a part of the random number series, and therefore, it may not be possible to secure the secrecy completely by a method using pseudo random numbers. On the contrary, as random number data obtained from the physical random number generator are random number data of good quality having no periodicity and ensured uniformity, the secrecy of encoding can be improved.

Next, a nineteenth embodiment of this invention will be described.

In this embodiment, a random number input device which enables it to take generated random number data into a computer will be described.

Figure 22:
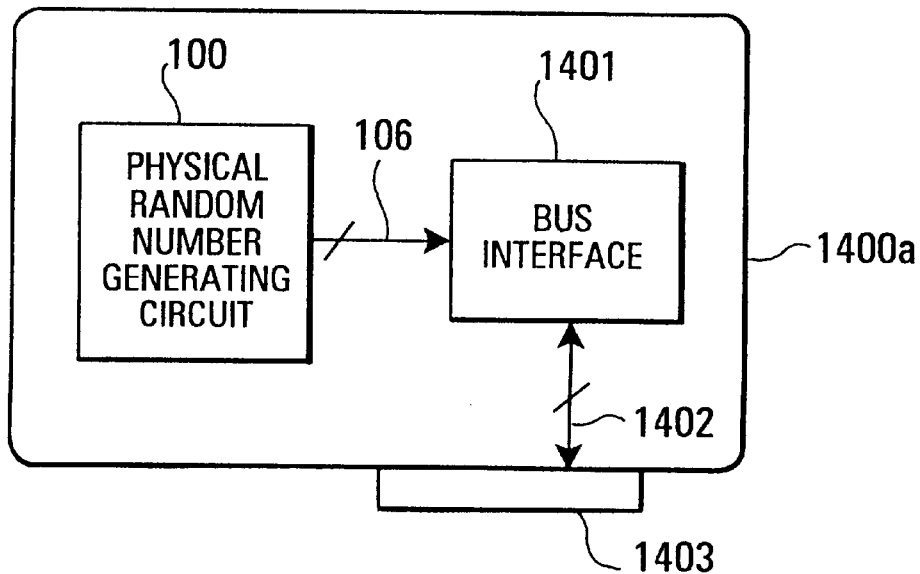
FIG. 22 is a block diagram showing one structure of a physical random number input device using a physical random number generator, according to a nineteenth embodiment of the present invention.

FIG. 22 is a block diagram showing the structure of one example of a random number input device using the physical random number generator according to the nineteenth embodiment of the present invention.

Figure 23:
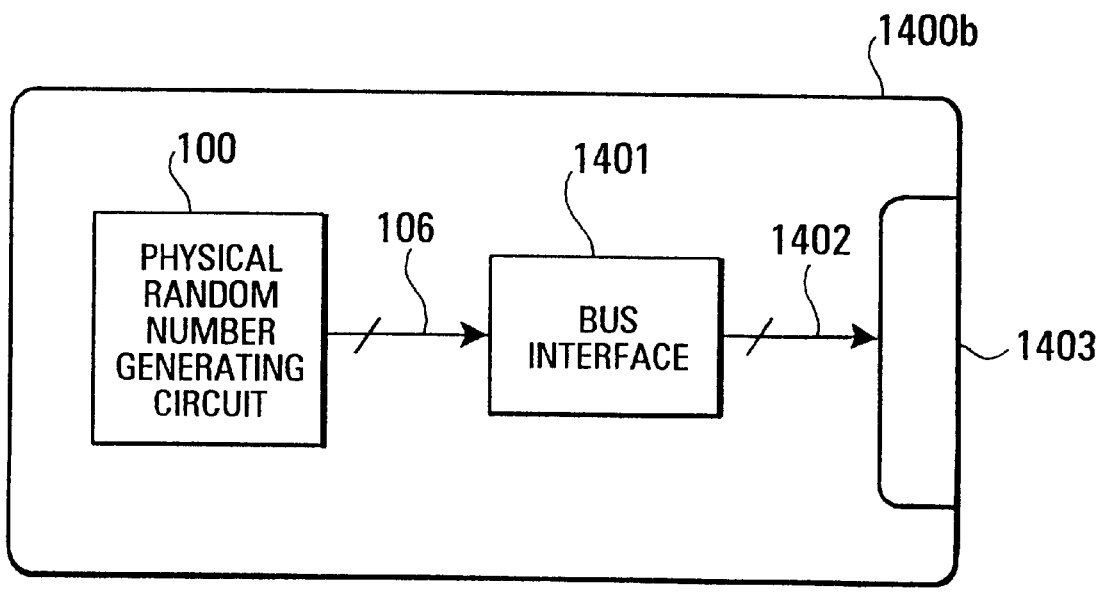
FIG. 23 is a block diagram showing another structure of a physical random number input device using a physical random number generator according to a nineteenth embodiment of the present invention.

FIG. 23 is a block diagram showing the structure of another example of a random number input device using the physical random number generator according to the nineteenth embodiment of the present invention.

Figure 24:
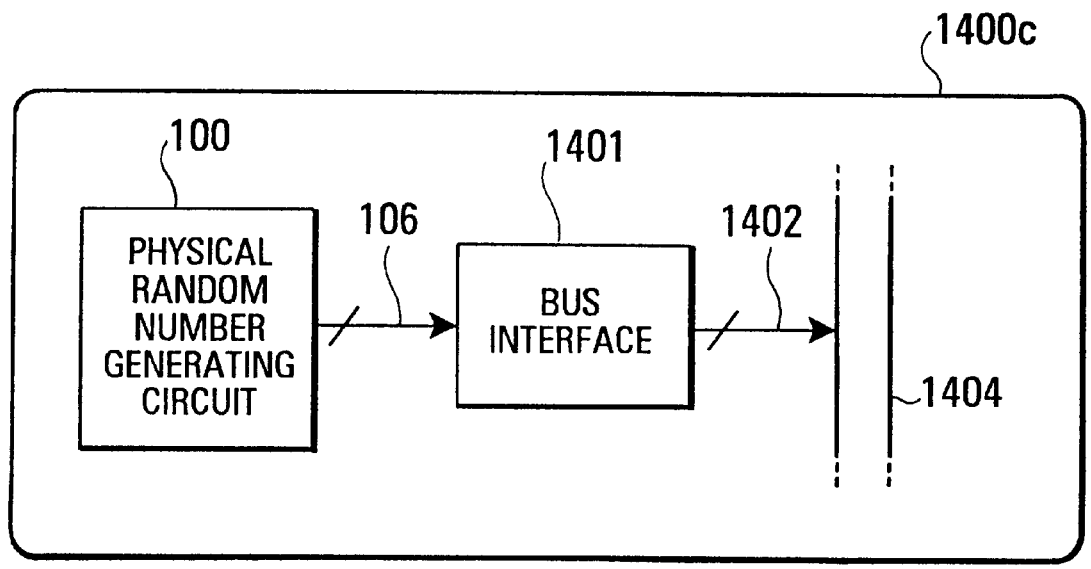
FIG. 24 is a block diagram showing still another structure of a physical random number input device using a physical random number generator according to a nineteenth embodiment of the present invention.

FIG. 24 is a block diagram showing the structure of still another example of a random number input device using the physical random number generator according to the nineteenth embodiment of the present invention. Here, the same component elements shown in FIG. 22 through FIG. 24 are assigned with the same reference numerals.

In any of the random number input devices shown in FIG. 22 through FIG. 24, random number data 106 output from physical random number generating circuit 100 is input to a bus interface 1401, and further, random numbers converted from random number data 106 in bus interface 1401 are output to a computer as a bus interface signal 1402.

Further, physical random number generating circuit 100 shown in any of FIG. 22 through FIG. 24 is in the same structure as in any of the physical random number generators described in the first through the fifteenth embodiments.

Bus interface signal 1402 is input to the computer via a computer data I/O bus 1403 (FIG. 22, FIG. 23) or a card internal bus 1404 (FIG. 24). This portion and the entire package, etc. differs for each of the random number input devices shown in FIGS. 22–24.

In the random number input device shown in FIG. 22 or FIG. 23, bus interface 1401 obtains random number data 106 from physical random number generating circuit 100 according to the instruction received from the computer via computer data I/O bus 1403 and transmits bus interface signal 1402 to the computer which has requested.

Shown in FIG. 22 is an example of the random number input device which is provided as a substrate 1400a. In this substrate type input device, physical random number generating substrate 1400a is used by inserting it into such a computer slot as a PCI bus.

Shown in FIG. 23 is an example of the random number input device which is provided as a card 1400b. In this card type input device, physical random number generating card 1400b is used by inserting it into such a card slot as a PCMCIA.

Shown in FIG. 24 is an example of the random number input device which is provided as an IC card 1400c. An IC card can be regarded as a kind of computer with a CPU (not shown) built in. Therefore, in this case, the random number input device is in a shape that it is incorporated in a computer itself.

That is, as IC card 1400c has a built-in CPU (not shown), random number data are output to the CPU in IC card 1400c via card inner bus 1404 instead of computer data I/O bus 1403. Thus, it is possible to achieve an IC card requiring random numbers of good quality for security.

As described above, in the random number input device using the physical random number generator according to this embodiment of the present invention, it is possible to achieve the downsizing and low pricing of a random number input device, as random number data 106 from physical random number generating circuit 100 are used for inputting random numbers into a computer.

Further, in particular, if a bus having the general usability, such as a PCI bus, is used for a computer I/O bus, it becomes possible to cope with various computers ranging from small computers such as personal computers to EWS (Engineering Work Station) and parallel computers by the development of one kind of substrate, and therefore the mass production also becomes possible. As a result, the low pricing, that is an object of the present invention, can be achieved more effectively.

Next, a twentieth embodiment of this invention will be described.

In this embodiment, it is possible to supply random number data to a plurality of computers by connecting one physical random number generator to a network.

Figure 25:
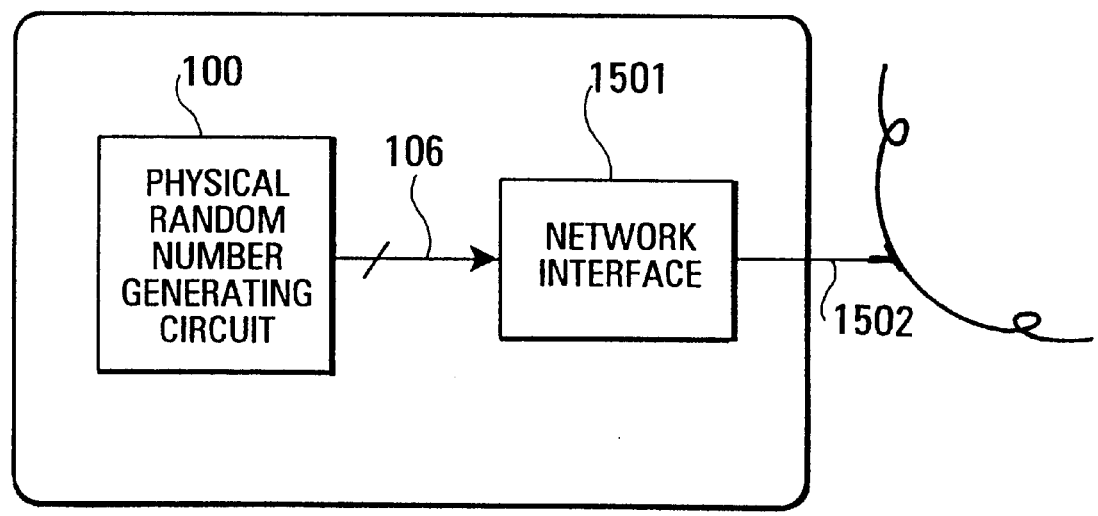
FIG. 25 is a block diagram showing the structure of a physical random number input device using a physical random number generator according to a twentieth embodiment of the present invention.

FIG. 25 is a block diagram showing the structure of a physical random number generator according to the twentieth embodiment of the present invention.

This physical random number generator is composed of physical random number generating circuit 100 and a network interface 1501. Further, physical random number generating circuit 100 is in the same structure as in any of the physical random number generators described in the first through the fifteenth embodiments.

Network interface 1501 obtains random number data 106 from physical random number generating circuit 100 and transmits them to a network according to an instruction received via a network cable 1502.

As described above, in the physical random number generator in this embodiment of the present invention, as random number data 106 from physical random number generating circuit 100 are used for random numbers to be provided to a network, it is possible to use physical random numbers at a low price in a plurality of computers.

That is, as a single unit of exclusive physical random number generator supplies random number data to a plurality of computers, a unit price relative to physical random number generation per computer can be suppressed to a low level. Thus, it becomes possible to achieve the low priced physical random number generator, that is an object of the present invention.

Next, a twenty-first embodiment of this invention will be described.

In this embodiment, a physical random number generator with the storing and reproducing function to stably supply physical random number data against data request is described.

In particular, in the case where a computer demands random number data, the possibility for demanding random number data only at high speed is low, and random number data supplied by the physical random number generator may become excessive in many cases because the computer performs several other operations while demanding random number data.

So, the physical random number generator in this embodiment enables it to provide random number data at a high speed and sufficiently against a demand up to the capacity of a memory by storing random number data in the memory, for instance, during the night time with less demands for physical random number data and supplying them from the memory when demanded.

Figure 26:
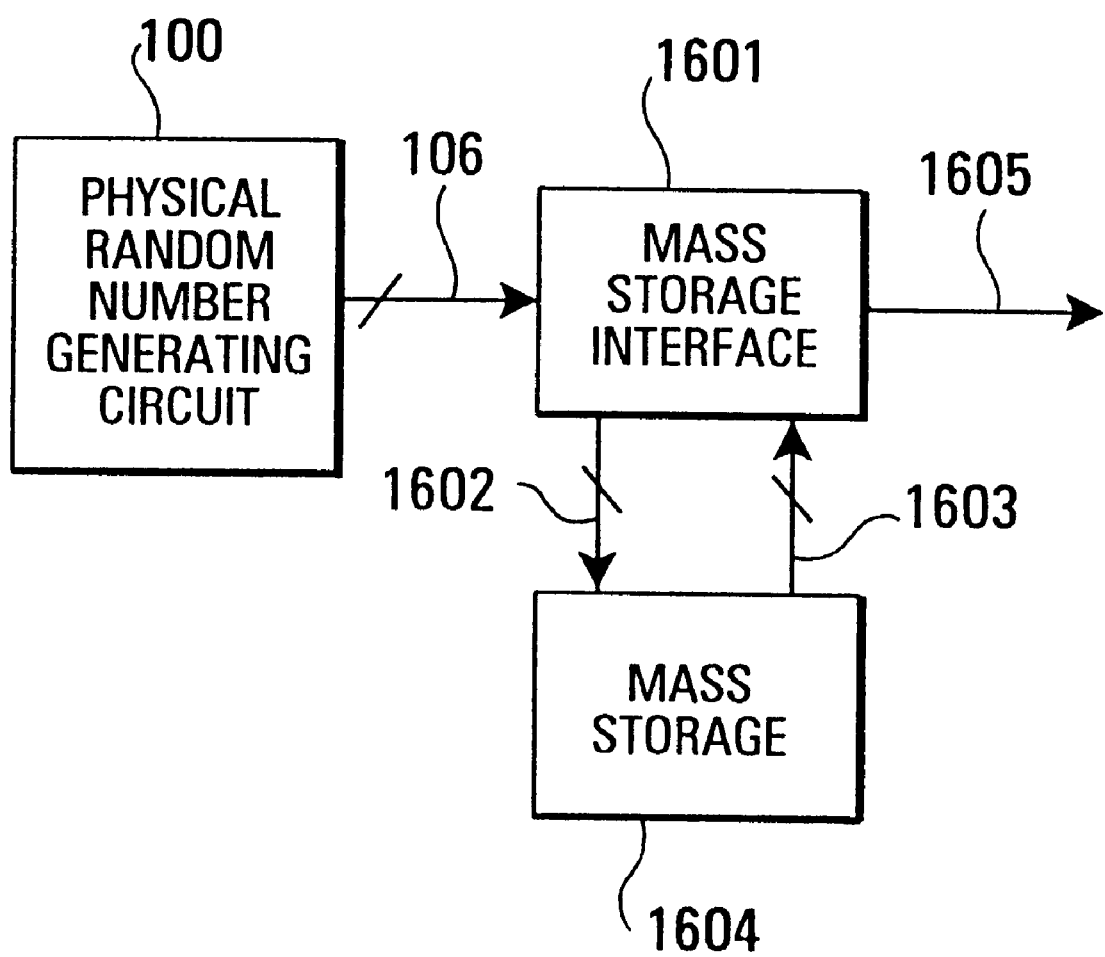
FIG. 26 is a block diagram showing the structure of a physical random number generator according to a twenty-first embodiment of the present invention.

FIG. 26 is a block diagram showing the structure of a physical random number generator according to the twenty-first embodiment of the present invention.

This physical random number generator with the storing and reproducing function is composed of physical random number generating circuit 100, a mass storage interface 1601 and a mass storage 1604. Further, physical random number generating circuit 100 is in the same structure as any of the physical random number generators described in the first through the fifteenth embodiments.

Mass storage interface 1601 stores random number data 106 once in mass storage 1604 as data 1602, and then reproduces random number data from mass storage 1604 based on an output 1603 according to a demand by an external device (not shown), and outputs them as reproduced random number data 1605.

As described above, in the physical random number generator in this embodiment of the present invention, when random number data 106 is used in the state where the random number output frequency fluctuates, by using mass storage 1604 which functions as a buffer, it is possible to cope with demands for random number generation even when increased momentarily.

That is, it becomes possible to buffer momentarily increased demands for random number data by storing excessively generated random number data in a mass storage, and therefore it becomes possible to supply random number data stably.

Next, a twenty-second embodiment of this invention will be described.

In this embodiment, the physical random number generator which enables to provide physical random number data by storing on a storing medium such as floppy disk, CD-ROM, etc. will be described.

As for the physical random numbers, it is possible to generate uniform random numbers of good quality with less periodicity, but on the other hand, it may become a problem for use that the order of generating random number data cannot be estimated. To solve this problem, for instance, when encoding data to be transmitted, if data (decoding key)

showing only a place where random number data used in the encoding exist are transmitted together with transmitting data by using a medium stored with the same contents as those stored in a medium retained by a receiving side, it becomes possible to exchange information in the state where the transmitting data are not at all decoded by a third party.

So, in this embodiment, physical random number data prepared by any of the physical random number generators in the first through the fifteenth embodiments are stored on a portable storing medium. As a storing medium for this purpose, FD (Floppy Disk), MO (Magnet Optical disk), CD-ROM, DVD-ROM and the like are used.

As described above, in the physical random number generator in this embodiment of the present invention, as the physical random number data generated by any of the physical random number generators in the first through the fifteenth embodiments is stored on a portable storing medium, it is possible to retain a storing medium stored with physical random number data by the parties concerned making the communication and to make the encoding/decoding of data without being known by the third party.

Thus, random number data can be obtained at a price far cheaper than a price for purchasing hardware for generating physical random data.

Next, a twenty-third embodiment of this invention will be described.

In this embodiment, it is devised to supply random number data with ensured quality in the twenty-second embodiment.

There are a plurality of examination methods to show the quality of random numbers. When using random numbers it is a general practice to use random number data after performing several examinations, but times needed for software development and other works for the examinations become enormous. Therefore, in this embodiment, it is devised to provide a portable storing medium stored with an examination method showing the quality of random numbers and the result of the examination together with random number data.

In this embodiment, physical random number data prepared by any of the physical random number generators in the first through the fifteenth embodiments are stored on a portable storing medium and also, its examination method and the result of examination are stored on that storing medium.

Here, an examination method is described.

It may be said that an established firm procedure for judging whether a given sequence can be regarded as a random number sequence is not available at present. A method that is usually used is to examine an assumption that the sequence is a random sample from a uniform population by several methods and to make the judgement from the overall result of these methods.

Kind of examination, execution procedures, selection of parameters, etc. are left to the selection by a person who performs the examination, and even a standard method of examination has not yet been established.

The following methods of examination are available.

First, following methods of examination are considered:
(1) One dimensional, two dimensional and three dimensional frequency examinations
(2) Examination of Marcov process By regarding a given sequence as one realized value of Marcov process as if the transition between statuses is an equal probability, the degree of equal probability of the sample transition number is examined.

(3) Examination of moment (mean, variance)
(4) Examination of correlation coefficient of a series of 1, 2, . . . in delay
(5) Examination of two and three dimensional random distances
(6) Run test (distribution of lengths of ascending and descending run, average of quantity, code run)

Further, other methods (the traditional methods used for the examination of the table of random numbers of Japanese Standards Association, etc.) shown below are considered:
(1) One dimensional frequency examination
(2) Two dimensional frequency examination (Series examination)
(3) Examination of Poker
(4) Run test (ascending run, descending run)
(5) Examination of gap
(6) Examination of collision
(7) Examination of OPSO In addition, other methods shown below are also considered (for a random number generator for pinball machines):
(1) One dimensional frequency examination
(2) Two dimensional frequency examination
(3) Spectrum examination
(4) Examination according to correlation coefficient
(5) Examination according to auto-correlation coefficient, and deviated (biased) auto-correlation coefficient
(6) Run test Further, as a medium for this purpose, FD, MO, CD-ROM, DVD-ROM, etc. are used.

As described above, in the physical random number generator in this embodiment of the present invention, as physical random number data generated in any of the physical random number generators in the first through the fifteenth embodiments, the examination methods and the examination results thereof are stored in a portable storing medium, the same effects as those in the twenty-second embodiment are obtained. In addition, according to the examination methods and the examination results thereof, the quality of random number data stored on the storing medium can be easily confirmed.

That is, user who uses random number data stored on this storing medium is able to use the data reliably without necessity for examining the data again, and this will result in the wide use of physical random numbers.

The effects obtained from the physical random number generators shown in the above-described embodiments are arranged as follows:

(1) Improvement of physical random number generating speed

The conventional random number generating method is based on the counting of random pulses. On the contrary, in this invention, as the statistical distribution obtained by directly sampling a noise source is used, random numbers can be generated at a high speed.

(2) Simplification of noise source and random number generating and processing circuit As against the conventional random number generating method to generate one bit of random number per noise source, in this invention, an A/D converter is used and therefore, a plurality of bits can be generated at one time.

(3) Provision of random numbers having the characteristic of good quality

As a statistical phenomenon such as thermal noise is caught electrically, generated random numbers are based on the random phenomenon in the natural world, and it is possible to provide random numbers having the characteristic of good quality.

(4) Application of random number generators to a wide field

In the application to computers, random number generators can be applied to a wide field ranging from personal computers to general use computers. In the civil life application, random number generators can be applied to game machines, pinball machines and IC cards.

The present invention is not limited to the above-described embodiments, but various changes and modifications may be made without departing from the gist of the present invention.

Further, the techniques as set forth in the above-described embodiments can be stored in such storing media as magnetic disk (floppy disk, hard disk, etc.), optical disk (CD-ROM, DVD, etc.), semiconductor memory, etc. as programs (software) that can be executed by a computer, or delivered and distributed by communication media. Further, programs stored in storage media include setup programs for installing, in a computer, software (including not only execution programs but also table and data structures) executed in the computer. A computer realizing this physical random number generator reads the program stored in a storing medium, installs this software by the setup program when necessary, and by controlling the operation by this software executes the above-described processes.

According to the present invention as described in detail in the above, it is possible to provide a physical random number generator and a method of generating physical random numbers which can improve the physical random number generating speed and can provide physical random numbers having the characteristic of good quality as random numbers. Furthermore, it is possible to provide a physical random number generator and a method of generating physical random numbers and a physical random number storing medium capable of applying to a wide field including general use computers, personal computers, and civil life level application such as game machines, etc.

Obviously, numerous modifications and variations of the present invention are possible in light of the above teachings. It is therefore to be understood that within the scope of the appended claims, the invention may be practiced otherwise than as specifically described herein.

What is claimed is:

1. A physical random number generator, comprising:
   a noise source configured to generate a noise signal;
   an alternating current AC coupling amplifying device configured to amplify said noise signal while removing a direct current DC component therefrom by AC coupling to generate an amplified noise signal;
   an analog/digital A/D conversion device having an accuracy of not less than two bits and configured to A/D convert said amplified noise signal to digital values composed of bit data of not less than two bits; and
   a processing device configured to process said amplified noise signal prior to A/D conversion and to process digital values converted from a processed amplified noise signal to generate random number data of not less than two bits with an increased differential nonlinearity as compared to digital values unprocessed by said processing device.

2. The physical random number generator according to claim 1, further comprising:
   an offset adjusting device configured to obtain a mean value of said digital values converted by said A/D conversion device to generate said mean value as a digital offset adjusting signal, to D/A convert said digital offset adjusting signal to an analog offset adjusting signal, and to subtract said analog offset adjusting signal from said amplified noise signal;
   wherein, instead of said amplified noise signal, a subtracted value of said analog offset adjusting signal from said amplified noise signal is input to said A/D conversion device.

3. The physical random number generator according to claim 1, further comprising:
   an offset adjusting device configured to obtain a mean value of said digital values converted by said A/D conversion device to generate said mean value as a digital offset adjusting signal to said digital values,
   wherein added values of digital offset adjusting signal and said digital signal are output as said random number data.

4. The physical random number generator according to claim 1, wherein:
   said A/D conversion device has an accuracy of not less than six bits;
   said A/D conversion device takes out at least two bits out of fifth and subsequent bits counted from the highest bit in not less than six bit data composing said digital values converted by said A/D conversion device as taken out data; and
   said A/D conversion device generates said taken out data as said random number data.

5. The physical random number generator according to claim 1, wherein:
   said A/D conversion device has a conversion range which is wider than a range (N±σ), when said digital values converted by said A/D conversion device become the normal distribution of an average N and a variance $\sigma^2$, and regards said digital values as valid only when said digital values fall in said conversion range.

6. The physical random number generator according to claim 1, wherein:
   said processing device includes a differential nonlinearity increasing device configured to add differential nonlinearity-increasing analog data to input values of said A/D conversion device as an offset and to subtract differential nonlinearity-increasing digital data equivalent from said digital values converted from an added amplified noise signal;
   wherein resultant subtracted data are output as said random number data.

7. The physical random number generator according to claim 1, wherein:
   said processing device includes a differential nonlinearity increasing device configured to add and average a plurality of said digital values converted from said A/D conversion device,
   wherein average values of said digital values are output as said random number data.

8. The physical random number generator according to claim 1, wherein a plurality of said A/D conversion devices are provided each with said processing device, wherein:
   said processing device includes a differential nonlinearity increasing device configured to add and average a plurality of said digital values converted from said A/D conversion device,
   wherein average values of said digital values are output as said random number data.

9. The physical random generator according to claim 1, further comprising;
   a pseudo random number generator configured to generate pseudo random number data; and
   a differential nonlinearity increasing device configured to add and subtract said digital values converted from said A/D conversion device and said pseudo random number data,
   wherein average values of said digital values and said pseudo random number data are output as said random number data.

10. The physical random number generator according to claim 1, wherein:
   said noise source generates thermal noise as said noise signal.

11. The physical random number generator according to claim 10, wherein:
   said noise source generates said thermal noise of a resistor as said noise signal.

12. The physical random number generator according to claim 10, wherein:
   said noise source generates said thermal noise of a semiconductor device as said noise signal.

13. The physical random number generator according to claim 10, wherein:
   said noise source generates said thermal noise of a photoelectric conversion surface of a photomultiplier as said noise signal.

14. The physical random number generator according to claim 10, wherein:
   said noise source generates said thermal noise generated from a cathode of a vacuum tube as said noise signal.

15. The physical random number generator according to one of claims 10 to 14, further comprising:
   a thermostatic device configured to maintain said noise source at a constant high temperature.

16. The physical random number generator according to claim 1, wherein:
   said noise source generates fluctuation of electrons generated in a vacuum microelement as said noise signal.

17. A physical random number display device, comprising:
   said physical random number generator according to claim 1; and
   a display device configured to display data based on said random number data generated from said physical random number generator.

18. A communication equipment, comprising:
   said physical random number generator according to claim 1; and
   a signal modulation device configured to modulate a signal using said random number data generated from said physical random number generator.

19. A data encoder, comprising:
   said physical random number generator according to claim 1; and
   an encoding data using said random number data generated from said physical random number generator.

20. A physical random number input device, comprising:
   said physical random number generator according to claim 1; and
   a bus interface device connected to interface with a data input/output bus of a computer configured to input said random number data generated from said physical random number generator into said computer.

21. A physical random number input device, comprising:
   said physical random number generator according to claim 1; and
   a network interface device connected to interface with a computer network configured to transmit said random number data generated from said physical random number generator to said computer network in response to a request from a computer.

22. The physical random number generator according to claim 1, further comprising:
   a storage device configured to store said random number data and to supply said stored random number data in response to a request to output said random number data.

23. A physical random number storing medium readable by a computer in which said random number data generated by said physical random number generator according to claim 1 are stored.

24. The physical random number storing medium according to claim 23, wherein:
   at least one of an examination method of said stored random number data and an examination result of said stored random number data is stored.

25. The physical random number generator according to claim 1, wherein:
   said A/D conversion device has a conversion range for its input signal of said amplified noise signal, and regards said digital values as valid only when said input signal falls in said conversion range.

26. The physical random number generator according to claim 1, wherein:
   said processing means includes a differential nonlinearity increasing device configured to add and average said digital values converted from said A/D conversion device and secondary digital data provided by and converted from a secondary noise source, said secondary digital data not outputted from said A/D conversion device;
   wherein average values of said digital values are output as said processed data.

27. A method of generating physical random numbers, comprising the steps of:
   generating a noise signal from a noise source;
   amplifying said noise signal while removing a direct current DC component therefrom by alternate current AC coupling to generate an amplified noise signal;
   analog/digital A/D converting said amplified noise signal to digital values composed of bit data of not less than two bits;
   processing said amplified noise signal prior to A/D conversion; and
   processing digital values converted from a processed amplified noise signal to generate random number data of not less than two bits with an increased differential nonlinearity as compared to digital values unprocessed by said processing device; and
   outputting generated random number data as an output of said physical random number generator.

* * * * *